(12) United States Patent
Raghavan et al.

(10) Patent No.: US 12,374,787 B2
(45) Date of Patent: Jul. 29, 2025

(54) ADJUSTING COMMUNICATIONS OPERATIONS FOR CHANGES TO CONFIGURATIONS FOR QUASI CO-LOCATION AND NUMBER OF ANTENNA ELEMENTS

(71) Applicant: QUALCOMM Incorporated, San Diego, CA (US)

(72) Inventors: Vasanthan Raghavan, West Windsor Township, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/170,315

(22) Filed: Feb. 8, 2021

(65) Prior Publication Data

US 2021/0250940 A1 Aug. 12, 2021

Related U.S. Application Data

(60) Provisional application No. 62/975,179, filed on Feb. 11, 2020.

(51) Int. Cl.
*H04W 72/21* (2023.01)
*H01Q 3/28* (2006.01)
(Continued)

(52) U.S. Cl.
CPC .............. *H04W 72/21* (2023.01); *H01Q 3/28* (2013.01); *H01Q 3/34* (2013.01); *H04W 52/04* (2013.01)

(58) Field of Classification Search
CPC .... H04B 7/0617; H04B 7/0695; H04B 7/088; H04B 7/063; H04B 7/0608; H04B 7/0413;
(Continued)

(56) References Cited

U.S. PATENT DOCUMENTS 6,002,360 A 12/1999 Wolcott et al.
7,787,554 B1 8/2010 Nabar et al.
(Continued)

FOREIGN PATENT DOCUMENTS

CN 1761182 A 4/2006
CN 201902262 U 7/2011
(Continued)

OTHER PUBLICATIONS

International Search Report and Written Opinion—PCT/US2021/017280—ISA/EPO—dated Jul. 12, 2021.
(Continued)

*Primary Examiner* — Golam Sorowar
(74) *Attorney, Agent, or Firm* — Holland & Hart LLP/QUALCOMM Incorporated

(57) ABSTRACT

Methods, systems, and devices for wireless communications are described in which a first device may determine a state change based on a condition associated with communications between the first device and a second device and perform an adjustment for one or more sets of antenna elements of the first device based on the state change. A state change may, for example, include a change of an antenna configuration or a quasi co-location (QCL) configuration of the respective device. Based on determining the state change, the first device may transmit a state change request to the second device. According to the state change request, the second device may perform an adjustment for a set of one or more of its antenna elements. The second device may transmit an indication of an adjustment to the first device, and the first device and the second device may communicate according to the adjustment.

42 Claims, 17 Drawing Sheets

(51) Int. Cl.
*H01Q 3/34* (2006.01)
*H04W 52/04* (2009.01)

(58) Field of Classification Search
CPC .. H04B 17/318; H04B 7/0628; H04B 7/0417;
H04B 7/0626; H04B 7/0691; H04B
7/0619; H04B 7/086; H04B 7/0408;
H04B 17/336; H04B 7/0404; H04B
7/0491; H04B 7/0634; H04B 17/382;
H04B 7/0456; H04B 7/0874; H04B
17/21; H04B 17/345; H04B 7/02; H04B
7/0469; H04B 7/061; H04B 7/0613;
H04B 7/0684; H04B 7/0802; H04B
7/0837; H04W 4/80; H04W 84/12; H04W
16/28; H04W 24/08; H04W 72/042;
H04W 64/00; H04W 72/0446; H04W
72/046; H04W 76/14; H04W 56/001;
H04W 4/023; H04W 12/08; H04W 24/10;
H04W 72/085; H04W 52/0216; H04W
64/003; H04W 72/082; H04W 76/15;
H04W 4/026; H04W 52/367; H04W
72/048; H04W 88/08; H04W 12/50;
H04W 48/12; H04W 68/02; H04W
72/0413; H04W 74/0816; H04W 74/0833;
H04L 5/0048; H04L 5/0055; H04L
5/0051; H04L 5/001; H04L 5/0023; H04L
5/0053; H04L 63/107; H04L 5/0091;
H04L 43/16; H04L 5/005; H04L 5/0057;
H04L 5/1469; H04L 1/0026; H04L
2025/03707; H04L 25/03006; H04L
27/0006; H04L 5/0062; H04L 5/0094;
H04L 63/0492; H04L 63/08; H04L 63/10;
H04L 63/20; H04L 1/1671; H04L 1/1861;
H04L 43/022; H04L 5/0007; H04L
1/0002; H04L 1/0003; H04L 1/0009
See application file for complete search history.

(56) References Cited

U.S. PATENT DOCUMENTS

| | | | |
|---|---|---|---|
| 7,826,415 B2 | 11/2010 | Oh et al. | |
| 8,503,322 B2 | 8/2013 | Krishnamurthy et al. | |
| 9,312,933 B2 | 4/2016 | Zhang et al. | |
| 9,363,683 B2 | 6/2016 | Raghavan et al. | |
| 9,509,382 B1 | 11/2016 | Nabar et al. | |
| 9,520,973 B2 | 12/2016 | Kim et al. | |
| 9,780,928 B2 | 10/2017 | Moshfeghi | |
| 9,806,777 B1 | 10/2017 | Doostnejad et al. | |
| 10,004,032 B2 | 6/2018 | Islam et al. | |
| 10,075,223 B1 | 9/2018 | Pawar et al. | |
| 10,425,878 B2 | 9/2019 | Cezanne et al. | |
| 10,425,901 B2 | 9/2019 | Islam et al. | |
| 10,462,796 B2 | 10/2019 | Frenne et al. | |
| 10,559,880 B1 | 2/2020 | Garrett et al. | |
| 10,574,321 B2 | 2/2020 | Nilsson et al. | |
| 10,826,585 B2 | 11/2020 | Bolotin et al. | |
| 10,841,914 B2 | 11/2020 | Liou et al. | |
| 10,879,627 B1 | 12/2020 | Frigon et al. | |
| 10,924,173 B2 | 2/2021 | Bai et al. | |
| 10,986,235 B2 | 4/2021 | Seo et al. | |
| 11,438,877 B2 | 9/2022 | Luo et al. | |
| 2006/0008275 A1 | 1/2006 | Lacovara et al. | |
| 2006/0039318 A1* | 2/2006 | Oh | H04L 5/0087 |
| | | | 370/328 |
| 2007/0070927 A1 | 3/2007 | Shoki et al. | |
| 2008/0240208 A1 | 10/2008 | Lou et al. | |
| 2011/0069633 A1 | 3/2011 | Schmidt et al. | |
| 2011/0255434 A1 | 10/2011 | Ylitalo | |
| 2012/0015603 A1 | 1/2012 | Proctor, Jr. et al. | |
| 2012/0064841 A1 | 3/2012 | Husted et al. | |
| 2012/0140658 A1* | 6/2012 | Kanzaki | H04B 17/24 |
| | | | 370/252 |
| 2014/0011468 A1 | 1/2014 | Park et al. | |
| 2014/0206304 A1 | 7/2014 | Zhang et al. | |
| 2014/0235287 A1 | 8/2014 | Maltsev et al. | |
| 2014/0241446 A1* | 8/2014 | Zhang | H04B 7/0413 |
| | | | 375/260 |
| 2014/0294111 A1 | 10/2014 | Zhang et al. | |
| 2014/0363166 A1 | 12/2014 | Lacovara | |
| 2015/0092621 A1 | 4/2015 | Jalloul et al. | |
| 2015/0349863 A1 | 12/2015 | El Ayach et al. | |
| 2016/0020876 A1 | 1/2016 | Raghavan et al. | |
| 2016/0021548 A1 | 1/2016 | Raghavan et al. | |
| 2016/0044517 A1 | 2/2016 | Raghavan et al. | |
| 2016/0112173 A1 | 4/2016 | Wang et al. | |
| 2016/0242182 A1 | 8/2016 | Chen et al. | |
| 2017/0005958 A1 | 1/2017 | Frenkel et al. | |
| 2017/0013630 A1 | 1/2017 | Franz et al. | |
| 2017/0117947 A1 | 4/2017 | Petersson et al. | |
| 2017/0164226 A1 | 6/2017 | Wei et al. | |
| 2017/0194706 A1 | 7/2017 | Lee et al. | |
| 2017/0195998 A1 | 7/2017 | Zhang et al. | |
| 2017/0294926 A1 | 10/2017 | Islam et al. | |
| 2017/0359826 A1 | 12/2017 | Islam et al. | |
| 2017/0364819 A1 | 12/2017 | Yang | |
| 2018/0062720 A1 | 3/2018 | Islam et al. | |
| 2018/0063693 A1 | 3/2018 | Chakraborty et al. | |
| 2018/0138962 A1 | 5/2018 | Islam et al. | |
| 2018/0227094 A1 | 8/2018 | Liu et al. | |
| 2018/0227772 A1 | 8/2018 | Yu et al. | |
| 2018/0249453 A1 | 8/2018 | Nagaraja et al. | |
| 2018/0249526 A1 | 8/2018 | Nagaraja et al. | |
| 2018/0278309 A1* | 9/2018 | Raghavan | H04B 7/0617 |
| 2018/0278316 A1 | 9/2018 | Yang et al. | |
| 2018/0278320 A1 | 9/2018 | Chendamarai et al. | |
| 2019/0044596 A1 | 2/2019 | Bolotin et al. | |
| 2019/0053220 A1* | 2/2019 | Zhang | H04L 5/0051 |
| 2019/0059056 A1 | 2/2019 | Islam et al. | |
| 2019/0069198 A1 | 2/2019 | Gheorghiu et al. | |
| 2019/0081691 A1 | 3/2019 | Nagaraja et al. | |
| 2019/0081753 A1* | 3/2019 | Jung | H04B 7/063 |
| 2019/0103908 A1 | 4/2019 | Yu et al. | |
| 2019/0141552 A1 | 5/2019 | Chen et al. | |
| 2019/0150161 A1 | 5/2019 | Cheng et al. | |
| 2019/0174385 A1 | 6/2019 | Sang et al. | |
| 2019/0190582 A1 | 6/2019 | Guo et al. | |
| 2019/0239092 A1 | 8/2019 | Zhou et al. | |
| 2019/0268118 A1 | 8/2019 | Sadiq et al. | |
| 2019/0349058 A1 | 11/2019 | Raghavan et al. | |
| 2019/0349863 A1 | 11/2019 | Lim et al. | |
| 2019/0393948 A1 | 12/2019 | Zhao et al. | |
| 2020/0015106 A1 | 1/2020 | Lane et al. | |
| 2020/0028545 A1 | 1/2020 | Koskela et al. | |
| 2020/0029274 A1 | 1/2020 | Cheng et al. | |
| 2020/0059280 A1 | 2/2020 | Thurfjell et al. | |
| 2020/0068644 A1 | 2/2020 | Zhou et al. | |
| 2020/0091978 A1 | 3/2020 | Noh et al. | |
| 2020/0136708 A1 | 4/2020 | Pan et al. | |
| 2020/0145079 A1 | 5/2020 | Marinier et al. | |
| 2020/0145929 A1 | 5/2020 | Ryu et al. | |
| 2020/0178134 A1 | 6/2020 | Yang et al. | |
| 2020/0178261 A1 | 6/2020 | Ioffe et al. | |
| 2020/0220603 A1 | 7/2020 | Hao et al. | |
| 2020/0220631 A1 | 7/2020 | Onggosanusi et al. | |
| 2020/0228190 A1 | 7/2020 | Cirik et al. | |
| 2020/0259618 A1 | 8/2020 | Yang et al. | |
| 2020/0259703 A1 | 8/2020 | Cirik et al. | |
| 2020/0260300 A1 | 8/2020 | Cirik et al. | |
| 2020/0314906 A1 | 10/2020 | Goyal et al. | |
| 2020/0351798 A1 | 11/2020 | Ji et al. | |
| 2020/0358509 A1 | 11/2020 | Wernersson et al. | |
| 2020/0366348 A1 | 11/2020 | Bolotin et al. | |
| 2020/0367083 A1 | 11/2020 | Hao et al. | |
| 2020/0374806 A1 | 11/2020 | Manolakos et al. | |
| 2020/0374960 A1* | 11/2020 | Deenoo | H04W 72/1284 |
| 2020/0383060 A1 | 12/2020 | Park et al. | |
| 2021/0021325 A1 | 1/2021 | Davydov et al. | |
| 2021/0022094 A1 | 1/2021 | Luo et al. | |
| 2021/0036741 A1 | 2/2021 | Park et al. | |

(56) References Cited

U.S. PATENT DOCUMENTS

| | | |
|---|---|---|
| 2021/0050898 A1* | 2/2021 | Yu .................. H04L 1/0008 |
| 2021/0068077 A1 | 3/2021 | Raghavan et al. |
| 2021/0084672 A1 | 3/2021 | Gulati et al. |
| 2021/0099958 A1 | 4/2021 | Bae et al. |
| 2021/0105780 A1 | 4/2021 | Jin et al. |
| 2021/0105860 A1 | 4/2021 | Tsai et al. |
| 2021/0111779 A1 | 4/2021 | Kundargi et al. |
| 2021/0119688 A1 | 4/2021 | Enescu et al. |
| 2021/0127379 A1 | 4/2021 | Harrebek et al. |
| 2021/0136598 A1 | 5/2021 | Raghavan et al. |
| 2021/0144716 A1 | 5/2021 | Choi et al. |
| 2021/0153085 A1 | 5/2021 | Rahman et al. |
| 2021/0153209 A1 | 5/2021 | Guan et al. |
| 2021/0159946 A1 | 5/2021 | Raghavan et al. |
| 2021/0159966 A1 | 5/2021 | Xi et al. |
| 2021/0160850 A1 | 5/2021 | Akkarakaran et al. |
| 2021/0160881 A1 | 5/2021 | Rahman et al. |
| 2021/0226681 A1 | 7/2021 | Raghavan et al. |
| 2021/0234586 A1 | 7/2021 | Raghavan et al. |
| 2021/0234593 A1 | 7/2021 | Raghavan et al. |
| 2021/0234597 A1 | 7/2021 | Raghavan et al. |
| 2021/0234598 A1 | 7/2021 | Raghavan et al. |
| 2021/0234601 A1 | 7/2021 | Raghavan et al. |
| 2021/0234602 A1 | 7/2021 | Raghavan et al. |
| 2021/0234604 A1 | 7/2021 | Raghavan et al. |
| 2021/0235434 A1 | 7/2021 | Raghavan et al. |
| 2021/0251040 A1 | 8/2021 | Tang et al. |
| 2021/0265741 A1 | 8/2021 | Kenington |
| 2021/0329621 A1 | 10/2021 | Raghavan |
| 2021/0359826 A1 | 11/2021 | Wang et al. |
| 2021/0410094 A1 | 12/2021 | Cui et al. |
| 2022/0006539 A1* | 1/2022 | Sun .................. H04B 1/0458 |
| 2022/0070823 A1 | 3/2022 | Ma et al. |
| 2022/0086702 A1 | 3/2022 | Wang et al. |
| 2022/0149924 A1 | 5/2022 | Zhang et al. |
| 2022/0150717 A1 | 5/2022 | Geng et al. |
| 2022/0200146 A1 | 6/2022 | Du et al. |
| 2022/0201505 A1 | 6/2022 | Zhao et al. |
| 2022/0210810 A1 | 6/2022 | Khoshnevisan et al. |
| 2022/0210814 A1 | 6/2022 | Khoshnevisan |
| 2022/0345908 A1 | 10/2022 | Takano et al. |
| 2023/0051329 A1 | 2/2023 | Flordelis et al. |
| 2024/0027821 A1 | 1/2024 | Noguchi |
| 2024/0129922 A1 | 4/2024 | Raghavan et al. |

FOREIGN PATENT DOCUMENTS

| | | |
|---|---|---|
| CN | 109792610 A | 5/2019 |
| CN | 110073609 A | 7/2019 |
| CN | 110419177 A | 11/2019 |
| CN | 109391984 B | 10/2020 |
| CN | 113287349 A | 8/2021 |
| CN | 113287349 B | 11/2022 |
| EP | 3167653 A1 | 5/2017 |
| EP | 3536101 A1 | 9/2019 |
| JP | 2001526510 A | 12/2001 |
| JP | 2013501480 A | 1/2013 |
| TW | 201902262 A | 1/2019 |
| TW | 201921882 A | 6/2019 |
| TW | 201937873 A | 9/2019 |
| WO | WO-2014130893 A2 | 8/2014 |
| WO | WO-2016005843 A1 | 1/2016 |
| WO | WO-2016148838 A1 | 9/2016 |
| WO | WO-2017007564 A1 | 1/2017 |
| WO | WO-2017204546 A1 | 11/2017 |
| WO | WO-2018075205 A1 | 4/2018 |
| WO | WO-2018085709 A1 | 5/2018 |
| WO | 2018128885 | 7/2018 |
| WO | WO-2018144844 A1 | 8/2018 |
| WO | WO-2018219438 A1 | 12/2018 |
| WO | WO-2019014041 A1 | 1/2019 |
| WO | WO-2019029609 A1 | 2/2019 |
| WO | WO-2019140256 A1 | 7/2019 |
| WO | WO-2019192005 A1 | 10/2019 |
| WO | WO-2019213889 A1 | 11/2019 |
| WO | WO-2019231716 | 12/2019 |
| WO | WO-2020020453 A1 | 1/2020 |
| WO | WO-2020096903 A1 | 5/2020 |
| WO | WO-2020101757 A1 | 5/2020 |
| WO | WO-2021041533 A1 | 3/2021 |
| WO | WO-2021144114 A1 | 7/2021 |
| WO | WO-2021154737 A9 | 9/2021 |
| WO | WO-2022170622 A1 | 8/2022 |

OTHER PUBLICATIONS

Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.

Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15-line 16 p. 2, line 6-line 16, the Whole Document.

Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3.

Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.

Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.

Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3-p. 3, paragraph 2.4 p. 4, paragraph 3 figures 3-5.

Partial International Search Report—PCT/US2021/017280—ISA/EPO—dated May 27, 2021.

CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1-p. 3, paragraph section 2.2.

(56) References Cited

OTHER PUBLICATIONS

Motorola Mobility, et al., "Power Control for Multi-Panel Uplink Transmission", 3GPP TSG RAN WG1 AH-1901, 3GPP Draft; R1-1900944-PC-EMIMO-Other-Final, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1-p. 3, paragraph section 2.2.

Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2-p. 3, figure 2.

Fraunhofer Iis, et al., "Discussion on Signaling of Beam Correspondence", 3GPP TSG RAN WG1 Meeting #94bis, 3GPP Draft; R1-1811086_Discussion_on_Signaling_of_Beam_Correspondence, 3rd Generation Partnership Project (3GPP), Mobile Competence Centre; 650, Route Des Lucioles; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.

Mediatek Inc: "Discussion on UL Beam Management Procedure", 3GPP TSG RAN WG1 Meeting #88, 3GPP Draft; R1-1702731 Discussion on UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.

InterDigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 Pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.

Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, 27 Pages, Aug. 25, 2020 (Aug. 25, 2020) sections 1-2, section 4.1, the whole document.

Raghavan, et al., "Antenna Placement and Performance Tradeoffs With Hand Blockage in Millimeter Wave Systems", IEEE, Apr. 2019 (Year: 2019), 16 Pages.

Ali A., et al., "Spatial Covariance Estimation for Millimeter Wave Hybrid Systems using Out-of-Band Information", May 2019, Center for Transportation Research, pp. 1-14.

Jain I. K., "Millimeter Wave Beam Training: A Survey", arXiv, Sep. 2018, 2 Pages.

Zheng Z., et al., "Time of Arrival and Time Sum of Arrival Based NLOS Identification and Localization", IEEE 2012, 5 Pages.

Chen C., "Resolution to CIDs Related to Asymmetric Beamforming and Directional Allocation", IEEE 802.11-18/0158r3, Jan. 15, 2018, pp. 1-8.

Nokia, et al., "On CSI-RS Design for DL Beam Management", 3GPP Draft, 3GPP TSG RAN WG1 #88, R1-1703179, Athens, Greece, Feb. 13-17, 2017, 14 Pages, Feb. 7, 2017.

Interdigital Inc: "Views on Panel Activation and Deactivation", 3GPP TSG RAN WG1 #98, R1-1908233, Prague, CZ, Aug. 26, 2019-Aug. 30, 2019, 6 Pages.

Fraunhofer Iis., et al., "Discussion on Signaling of Beam Correspondence", R1-1811086, 3GPP TSG RAN WG1 Meeting #94bis Chengdu, China Oct. 8-12, 2018, 5 Pages.

Mediatek Inc: "Discussion on UL Beam Management Procedure", R1-1702731, 3GPP TSG RAN WG1 Meeting #88 Athens, Greece, Feb. 13-17, 2017, 4 Pages.

Apple Inc: "FR2 DL Inter-Band CA Architecture Considerations", 3GPP RAN WG4 Meeting #93, R4-1913540, Reno, USA, Nov. 18-21, 2019, 8 Pages, Nov. 9, 2019.

Samsung: "Remaining Details on QCL", 3GPP TSG RAN WG1#90b, R1-1717634, Prague, Czech Republic, Oct. 9-13, 2017, 9 Pages, Oct. 3, 2017, Section 4, 4.2 Intercarrier QCL.

* cited by examiner

ADJUSTING COMMUNICATIONS OPERATIONS FOR CHANGES TO CONFIGURATIONS FOR QUASI CO-LOCATION AND NUMBER OF ANTENNA ELEMENTS

CROSS REFERENCE

The present application for patent claims the benefit of U.S. Provisional Patent Application No. 62/975,179 by Raghavan et al., entitled "ADJUSTING COMMUNICATIONS OPERATIONS FOR CHANGES TO CONFIGURATIONS FOR QUASI CO-LOCATION AND NUMBER OF ANTENNA ELEMENTS," filed Feb. 11, 2020, assigned to the assignee hereof, and expressly incorporated by reference herein.

INTRODUCTION

The following relates generally to wireless communications, and more specifically to configurations for quasi co-location (QCL) and number of antenna elements.

Wireless communications systems are widely deployed to provide various types of communication content such as voice, video, packet data, messaging, broadcast, and so on. These systems may be capable of supporting communications with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations or one or more network access nodes, each simultaneously supporting communications for multiple communications devices, which may be otherwise known as user equipment (UE).

SUMMARY

A method of wireless communications at a first device is described. The method may include adjusting one or more operations for one or more sets of antenna elements of the first device according to a state change for the first device and transmitting, to a second device, a state change request for one or more sets of antenna elements of the second device based on determining the state change for the first device, where the state change is based on a condition associated with communications between the first device and the second device. The method may include receiving an indication of an adjustment for the one or more sets of antenna elements of the second device, the adjustment based on the state change request, and communicating with the second device based on the adjustment for the one or more sets of antenna elements of the second device.

An apparatus for wireless communications at a first device is described. The apparatus may include a processor and memory coupled to the processor. The processor and memory may be configured to adjust one or more operations for one or more sets of antenna elements of the first device according to a state change for the first device and transmit, to a second device, a state change request for one or more sets of antenna elements of the second device based on determining the state change for the first device, where the state change is based on a condition associated with communications between the first device and the second device. The processor and memory may be configured to receive an indication of an adjustment for the one or more sets of antenna elements of the second device, the adjustment based on the state change request, and communicate with the second device based on the adjustment for the one or more sets of antenna elements of the second device.

Another apparatus for wireless communications at a first device is described. The apparatus may include means for adjusting one or more operations for one or more sets of antenna elements of the first device according to a state change for the first device and means for transmitting, to a second device, a state change request for one or more sets of antenna elements of the second device based on determining the state change for the first device, where the state change is based on a condition associated with communications between the first device and the second device. The apparatus may include means for receiving an indication of an adjustment for the one or more sets of antenna elements of the second device, the adjustment based on the state change request, and means for communicating with the second device based on the adjustment for the one or more sets of antenna elements of the second device.

A non-transitory computer-readable medium storing code for wireless communications at a first device is described. The code may include instructions executable by a processor to adjust one or more operations for one or more sets of antenna elements of the first device according to a state change for the first device and transmit, to a second device, a state change request for one or more sets of antenna elements of the second device based on determining the state change for the first device, where the state change is based on a condition associated with communications between the first device and the second device. The code may include instructions executable by the processor to receive an indication of an adjustment for the one or more sets of antenna elements of the second device, the adjustment based on the state change request, and communicate with the second device based on the adjustment for the one or more sets of antenna elements of the second device.

In some examples of the method, apparatuses, and non-transitory computer-readable medium described herein, adjusting the one or more operations for the one or more sets of antenna elements of the first device may include operations, features, means, or instructions for increasing or decreasing a number of antenna elements of the one or more sets of antenna elements of the first device to be used for communicating with the second device. In some examples of the method, apparatuses, and non-transitory computer-readable medium described herein, adjusting the one or more operations for the one or more sets of antenna elements of the first device may include operations, features, means, or instructions for changing a QCL configuration associated with the one or more sets of antenna elements of the first device for communicating with the second device.

In some examples of the method, apparatuses, and non-transitory computer-readable medium described herein, the indication of the adjustment for the one or more sets of antenna elements of the second device indicates an updated transmit power of the second device that is associated with transmissions to the first device. In some examples of the method, apparatuses, and non-transitory computer-readable medium described herein, the indication of the adjustment for the one or more sets of antenna elements of the second device indicates an updated modulation and coding scheme (MCS) for the communication between the first device and the second device.

In some examples of the method, apparatuses, and non-transitory computer-readable medium described herein, the indication of the adjustment for the one or more sets of antenna elements of the second device may be received via a physical downlink control channel (PDCCH) or a physical uplink control channel (PUCCH). In some examples of the method, apparatuses, and non-transitory computer-readable medium described herein, the indication of the adjustment for the one or more sets of antenna elements of the second device may be received via one or more of downlink control information (DCI), a medium access control (MAC) control element (MAC-CE), or radio resource control (RRC) signaling.

Some examples of the method, apparatuses, and non-transitory computer-readable medium described herein may further include operations, features, means, or instructions for identifying a metric associated with the communication between the first device and the second device, where the condition may be based on a change of the metric. In some examples of the method, apparatuses, and non-transitory computer-readable medium described herein, the condition includes the change of the metric exceeding a threshold. In some examples of the method, apparatuses, and non-transitory computer-readable medium described herein, the metric includes a signal quality associated with the communication between the first device and the second device. In some examples of the method, apparatuses, and non-transitory computer-readable medium described herein, the condition may be based on a thermal characteristic, a power characteristic, or both, of one or more of the first device or the second device.

In some examples of the method, apparatuses, and non-transitory computer-readable medium described herein, the first device may be a UE in a wireless communications system and the second device may be a base station in the wireless communications system. In some examples of the method, apparatuses, and non-transitory computer-readable medium described herein, one or more of the first device or the second device may be one of a base station, a customer premises equipment (CPE), a relay device, a router, a repeater, or an integrated access and backhaul (IAB) node.

A method of wireless communications is described. The method may include receiving, from a first device, a state change request for one or more sets of antenna elements of a second device, where the state change request is based on one or more operations for one or more sets of antenna elements of the first device, and performing an adjustment for the one or more sets of antenna elements of the second device, the adjustment based on the state change request. The method may include transmitting, in response to receiving the state change request, an indication of the adjustment for the one or more sets of antenna elements of the second device and communicating with the first device based on the adjustment for the one or more sets of antenna elements of the second device.

An apparatus for wireless communications is described. The apparatus may include a processor and memory coupled to the processor. The processor and memory may be configured to receive, from a first device, a state change request for one or more sets of antenna elements of a second device, where the state change request is based on one or more operations for one or more sets of antenna elements of the first device, and perform an adjustment for the one or more sets of antenna elements of the second device, the adjustment based on the state change request. The processor and memory may be configured to transmit, in response to receiving the state change request, an indication of the adjustment for the one or more sets of antenna elements of the second device and communicate with the first device based on the adjustment for the one or more sets of antenna elements of the second device.

Another apparatus for wireless communications is described. The apparatus may include means for receiving, from a first device, a state change request for one or more sets of antenna elements of a second device, where the state change request is based on one or more operations for one or more sets of antenna elements of the first device, and means for performing an adjustment for the one or more sets of antenna elements of the second device, the adjustment based on the state change request. The apparatus may include means for transmitting, in response to receiving the state change request, an indication of the adjustment for the one or more sets of antenna elements of the second device and means for communicating with the first device based on the adjustment for the one or more sets of antenna elements of the second device.

A non-transitory computer-readable medium storing code for wireless communications is described. The code may include instructions executable by a processor to receive, from a first device, a state change request for one or more sets of antenna elements of a second device, where the state change request is based on one or more operations for one or more sets of antenna elements of the first device, and perform an adjustment for the one or more sets of antenna elements of the second device, the adjustment based on the state change request. The code may include instructions executable by the processor to transmit, in response to receiving the state change request, an indication of the adjustment for the one or more sets of antenna elements of the second device and communicate with the first device based on the adjustment for the one or more sets of antenna elements of the second device.

In some examples of the method, apparatuses, and non-transitory computer-readable medium described herein, the one or more operations for the one or more sets of antenna elements of the first device include an increased or decreased number of antenna elements of the one or more sets of antenna elements of the first device to be used for communicating with the second device. In some examples of the method, apparatuses, and non-transitory computer-readable medium described herein, the one or more operations for the one or more sets of antenna elements of the first device include a changed QCL configuration associated with the one or more sets of antenna elements of the first device for communicating with the second device.

In some examples of the method, apparatuses, and non-transitory computer-readable medium described herein, performing the adjustment for the one or more sets of antenna elements of the second device may include operations, features, means, or instructions for updating a transmit power of the second device based on the state change request, the transmit power associated with transmissions to the first device, where the indication of the adjustment for the one or more sets of antenna elements of the second device indicates the updated transmit power. In some examples of the method, apparatuses, and non-transitory computer-readable medium described herein, performing the adjustment for the one or more sets of antenna elements of the second device may include operations, features, means, or instructions for updating an MCS for communication between the first device and the second device based on the state change request, where the indication of the adjustment for the one or more sets of antenna elements of the second device indicates the updated MCS.

In some examples of the method, apparatuses, and non-transitory computer-readable medium described herein, the indication of the adjustment for the one or more sets of antenna elements of the second device may be transmitted via a PDCCH or a PUCCH. In some examples of the method, apparatuses, and non-transitory computer-readable medium described herein, the indication of the adjustment for the one or more sets of antenna elements of the second device may be transmitted via one or more of DCI, a MAC-CE, or RRC signaling.

In some examples of the method, apparatuses, and non-transitory computer-readable medium described herein, the state change request may be based on a condition associated with a metric associated with communication between the first device and the second device. In some examples of the method, apparatuses, and non-transitory computer-readable medium described herein, the condition includes a change of the metric exceeding a threshold. In some examples of the method, apparatuses, and non-transitory computer-readable medium described herein, the metric includes a signal quality associated with the communication between the first device and the second device. In some examples of the method, apparatuses, and non-transitory computer-readable medium described herein, the condition may be based on a thermal characteristic, a power characteristic, or both, of one or more of the first device or the second device.

In some examples of the method, apparatuses, and non-transitory computer-readable medium described herein, the first device may be a UE in a wireless communications system and the second device may be a base station in the wireless communications system. In some examples of the method, apparatuses, and non-transitory computer-readable medium described herein, one or more of the first device or the second device may be one of a base station, a CPE, a relay device, a router, a repeater, or an IAB node.

A method of wireless communications is described. The method may include determining, at a first device, a state change for the first device based on a condition associated with communication between the first device and a second device, and transmitting, to the second device, a state change request for one or more sets of antenna elements of second device based on determining the state change. The method may include receiving an indication of an adjustment for the one or more sets of antenna elements of the second device, the adjustment based on the state change request, and communicating with the second device based on the adjustment for the one or more sets of antenna elements of the second device.

An apparatus for wireless communications is described. The apparatus may include a processor and memory coupled to the processor. The processor and memory may be configured to determine at a first device, a state change for the first device based on a condition associated with communication between the first device and a second device, and transmit, to the second device, a state change request for one or more sets of antenna elements of the second device based on determining the state change. The processor and memory may be configured to receive an indication of an adjustment for the one or more sets of antenna elements of the second device, the adjustment based on the state change request, and communicate with the second device based on the adjustment for the one or more sets of antenna elements of the second device.

Another apparatus for wireless communications is described. The apparatus may include means for determining, at a first device, a state change for the first device based on a condition associated with communication between the first device and a second device, and transmitting, to the second device, a state change request for one or more sets of antenna elements of the second device based on determining the state change. The apparatus may include means for receiving an indication of an adjustment for the one or more sets of antenna elements of the second device, the adjustment based on the state change request, and means for communicating with the second device based on the adjustment for the one or more sets of antenna elements of the second device.

A non-transitory computer-readable medium storing code for wireless communications is described. The code may include instructions executable by a processor to determine, at a first device, a state change for the first device based on a condition associated with communication between the first device and a second device, and transmit, to the second device, a state change request for one or more sets of antenna elements of the second device based on determining the state change. The code may include instructions executable by the processor to receive an indication of an adjustment for the one or more sets of antenna elements of the second device, the adjustment based on the state change request, and communicate with the second device based on the adjustment for the one or more sets of antenna elements of the second device.

Some examples of the method, apparatuses, and non-transitory computer-readable medium described herein may further include operations, features, means, or instructions for adjusting one or more operations for one or more sets of antenna elements of the first device according to the state change for the first device. In some examples of the method, apparatuses, and non-transitory computer-readable medium described herein, adjusting the one or more operations for the one or more sets of antenna elements of the first device may include operations, features, means, or instructions for increasing or decreasing a number of antenna elements of the one or more sets of antenna elements of the first device to be used for communicating with the second device. In some examples of the method, apparatuses, and non-transitory computer-readable medium described herein, adjusting the one or more operations for the one or more sets of antenna elements of the first device may include operations, features, means, or instructions for changing a QCL configuration associated with the one or more sets of antenna elements of the first device for communicating with the second device.

In some examples of the method, apparatuses, and non-transitory computer-readable medium described herein, the indication of the adjustment for the one or more sets of antenna elements of the second device indicates an updated transmit power at the second device for transmitting to the first device. In some examples of the method, apparatuses, and non-transitory computer-readable medium described herein, the indication of the adjustment for the one or more sets of antenna elements of the second device indicates an updated MCS for the communication between the first device and the second device.

In some examples of the method, apparatuses, and non-transitory computer-readable medium described herein, the indication of the adjustment for the one or more sets of antenna elements of the second device may be received via a PDCCH or a PUCCH. In some examples of the method, apparatuses, and non-transitory computer-readable medium described herein, the indication of the adjustment for the one or more sets of antenna elements of the second device may be received via one or more of DCI, a MAC-CE, or RRC signaling.

Some examples of the method, apparatuses, and non-transitory computer-readable medium described herein may further include operations, features, means, or instructions for identifying a metric associated with the communication between the first device and the second device, where the condition may be based on a change of the metric. In some examples of the method, apparatuses, and non-transitory computer-readable medium described herein, the condition includes the change of the metric exceeding a threshold. In some examples of the method, apparatuses, and non-transitory computer-readable medium described herein, the metric includes a signal quality associated with the communication between the first device and the second device. In some examples of the method, apparatuses, and non-transitory computer-readable medium described herein, the condition may be based on a thermal characteristic, a power characteristic, or both, of one or more of the first device or the second device.

In some examples of the method, apparatuses, and non-transitory computer-readable medium described herein, the first device may be a UE in a wireless communications system and the second device may be a base station in the wireless communications system. In some examples of the method, apparatuses, and non-transitory computer-readable medium described herein, one or more of the first device or the second device may be one of a base station, a CPE, a relay device, a router, a repeater, or an IAB node.

A method of wireless communications is described. The method may include receiving, from a first device, a state change request for one or more sets of antenna elements of a second device, and performing an adjustment for the one or more sets of antenna elements of the second device, the adjustment based on the state change request. The method may include transmitting, in response to receiving the state change request, an indication of the adjustment for the one or more sets of antenna elements of the second device and communicating with the first device based on the adjustment for the one or more sets of antenna elements of the second device.

An apparatus for wireless communications is described. The apparatus may include a processor and memory coupled to the processor. The processor and memory may be configured to receive, from a first device, a state change request for one or more sets of antenna elements of a second device, and perform an adjustment for the one or more sets of antenna elements of the second device, the adjustment based on the state change request. The processor and memory may be configured to transmit, in response to receiving the state change request, an indication of the adjustment for the one or more sets of antenna elements of the second device and communicate with the first device based on the adjustment for the one or more sets of antenna elements of the second device.

Another apparatus for wireless communications is described. The apparatus may include means for receiving, from a first device, a state change request for one or more sets of antenna elements of a second device, and means for performing an adjustment for the one or more sets of antenna elements of the second device, the adjustment based on the state change request. The apparatus may include means for transmitting, in response to receiving the state change request, an indication of the adjustment for the one or more sets of antenna elements of the second device and means for communicating with the first device based on the adjustment for the one or more sets of antenna elements of the second device.

A non-transitory computer-readable medium storing code for wireless communications is described. The code may include instructions executable by a processor to receive, from a first device, a state change request for one or more sets of antenna elements of a second device, and perform an adjustment for the one or more sets of antenna elements of the second device, the adjustment based on the state change request. The code may include instructions executable by the processor to transmit, in response to receiving the state change request, an indication of the adjustment for the one or more sets of antenna elements of the second device and communicate with the first device based on the adjustment for the one or more sets of antenna elements of the second device.

In some examples of the method, apparatuses, and non-transitory computer-readable medium described herein, the state change request may be based on one or more adjusted operations for one or more sets of antenna elements of the first device according to a state change for the first device. In some examples of the method, apparatuses, and non-transitory computer-readable medium described herein, the one or more adjusted operations for the one or more sets of antenna elements of the first device include an increased or decreased number of antenna elements of the one or more sets of antenna elements of the first device to be used for communicating with the second device. In some examples of the method, apparatuses, and non-transitory computer-readable medium described herein, the one or more adjusted operations for the one or more sets of antenna elements of the first device include a changed QCL configuration associated with the one or more sets of antenna elements of the first device for communicating with the second device.

In some examples of the method, apparatuses, and non-transitory computer-readable medium described herein, performing the adjustment for the one or more sets of antenna elements of the second device may include operations, features, means, or instructions for updating a transmit power of the second device based on the state change request, the transmit power associated with transmissions to the first device, where the indication of the adjustment for the one or more sets of antenna elements of the second device indicates the updated transmit power. In some examples of the method, apparatuses, and non-transitory computer-readable medium described herein, performing the adjustment for the one or more sets of antenna elements of the second device may include operations, features, means, or instructions for updating an MCS for communication between the first device and the second device based on the state change request, where the indication of the adjustment for the one or more sets of antenna elements of the second device indicates the updated MCS.

In some examples of the method, apparatuses, and non-transitory computer-readable medium described herein, the indication of the adjustment for the one or more sets of antenna elements of the second device may be transmitted via a PDCCH or a PUCCH. In some examples of the method, apparatuses, and non-transitory computer-readable medium described herein, the indication of the adjustment for the one or more sets of antenna elements of the second device may be transmitted via one or more of DCI, a MAC-CE, or RRC signaling.

In some examples of the method, apparatuses, and non-transitory computer-readable medium described herein, the state change request may be based on a condition associated with a metric associated with communication between the first device and the second device. In some examples of the method, apparatuses, and non-transitory computer-readable medium described herein, the condition includes a change of the metric exceeding a threshold. In some examples of the method, apparatuses, and non-transitory computer-readable medium described herein, the metric includes a signal quality associated with the communication between the first device and the second device. In some examples of the method, apparatuses, and non-transitory computer-readable medium described herein, the condition may be based on a thermal characteristic, a power characteristic, or both, of one or more of the first device or the second device.

In some examples of the method, apparatuses, and non-transitory computer-readable medium described herein, the first device may be a UE in a wireless communications system and the second device may be a base station in the wireless communications system. In some examples of the method, apparatuses, and non-transitory computer-readable medium described herein, one or more of the first device or the second device may be one of a base station, a CPE, a relay device, a router, a repeater, or an IAB node.

DETAILED DESCRIPTION

Figure 1:
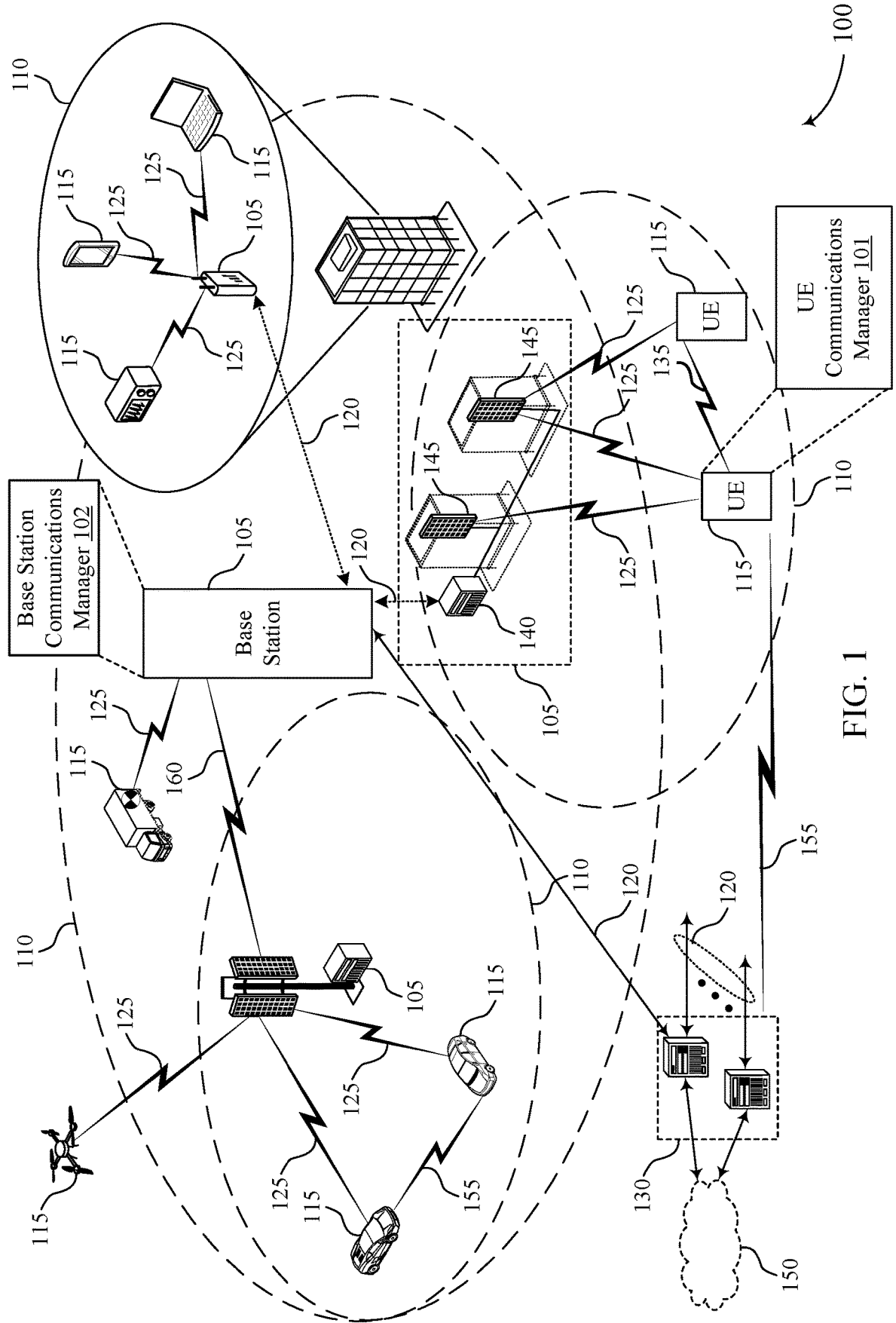
FIG. 1 illustrates an example of a wireless communications system that supports adjusting communications operations for changes to configurations for QCL and number of antenna elements in accordance with one or more aspects of the present disclosure.

In some deployments, wireless communications systems may operate in millimeter wave (mmW) frequency ranges (24 gigahertz (GHz), 26 GHz, 28 GHz, 39 GHz, 52.6-71 GHz, etc.). Wireless communication at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station or a UE) may be beamformed.

Moreover, a receiving device may use beamforming techniques to configure antenna(s), antenna element(s), antenna array(s), or antenna array module(s) such that transmissions are received in a directional manner. For example, a wireless device may use an antenna array (e.g., a phased array antenna system) to generate directional beams to transmit or receive transmissions in different or particular directions via a configuration of one or more antenna elements. In some cases, the wireless device may configure phase or amplitude parameters for one or more respective antenna elements of an antenna array, and the antenna elements may apply the configured phase or amplitude parameters to communicate respective element signals. The antenna array may generate a directional communication beam as a composite of the element signals from each antenna element. In some examples, the directional communication beam may be generated by manipulating a relationship between, for example, phase or amplitude for each of the respective antenna elements. The antenna elements of such an antenna array may be arranged in various configurations to facilitate forming such a directional beam as a composite of the element signals. For example, the antenna elements may be configured according to a first type (e.g., regular) of antenna array structure (e.g., a linear, planar, or circular arrangement of the antenna elements). Additionally or alternatively, the antenna elements may be configured according to a second type (e.g., irregular) of antenna array structure (e.g., a random or pseudo random set (e.g., subset) of antenna elements from a set of available antenna elements to be excited for transmission or reception). According to the techniques described herein, the antenna elements may be configured in any configuration that may facilitate beamformed communications. As described herein, a set of antenna elements, antenna elements of a subarray, antenna elements of an array (or antenna array), and similar terminology may each refer and be applicable to both the first type of antenna array structures and the second type of antenna array structures.

In some cases, a first device (e.g., a UE or other communications device) may operate according to a particular configuration for one or more of its sets of antenna elements. For example, the first device may use a subset of a set of antenna elements (e.g., of one or more antenna arrays or subarrays) of the first device to communicate with a second device (e.g., a base station or other communications device). Additionally or alternatively, in some cases, a QCL configuration may indicate QCL information or spatial relation information for the one or more sets of antenna elements of the first device, which may indicate that respective signals may have a QCL relationship (e.g., that antenna ports used for communicating the respective signals may share one or more characteristics, such as one or more spatial characteristics). For example, according to a particular QCL type, respective sets of antenna elements may share common beam characteristics, such as a beam direction, a beam width, a beam identifier, a spatial stream, and other spatial parameters. In certain examples, a beam configuration may be referred to as a beam indication, a beam indication of resources, or some similar terminology. In some cases, if multiple physical channels share beam characteristics such that one channel can be derived from another channel, the physical channels may be referred to as having a QCL relationship (which may be referred to as being "QCLed").

In some cases, the first device may change state (e.g., a transmission configuration indication (TCI) state) to account for various conditions. For example, the first device may change state, and in doing so, change an antenna element configuration of the first device to use a different number of antenna elements, a different geometry, or different antenna element properties (e.g., gain, coupling, coverage in terms of the elemental gain pattern, and other like properties). Additionally or alternatively, in a state change, the first device may change a QCL configuration of the first device to use a set of antenna elements (e.g., of one or more antenna arrays or subarrays) having a different QCL relationship than a set of antenna elements that the first device was previously using. In some examples, a state change may include a change of QCL configuration or antenna configuration (e.g., number of antenna elements to be used), which may correspond to the first device switching to a new beam.

The first device may switch beams in this way based on an occurrence of one or more of various conditions or situations. For example, the first device may measure a signal quality metric (e.g., signal-to-noise ratio (SNR), signal-to-interference plus noise ratio (SINR), received signal strength (RSS), reference signal received power (RSRP), reference signal received quality (RSRQ), etc.), and the first device may determine that the measured value for the signal quality metric exceeds a configured (e.g., preconfigured) value, such as a signal quality threshold. Based on the measured value of the signal quality metric exceeding the signal quality threshold, for example, the UE may change state to use a new QCL configuration or a new set of antenna elements, where the new configuration may provide an improved signal quality or other like performance improvement. For example, if the first device detects a degraded signal quality, the first device may switch to a different configuration to increase a link budget and correspondingly increase the likelihood that the first device can successfully communicate with the second device. Additionally or alternatively, the first device may determine to change configurations based on a thermal characteristic of the first device, a power characteristic of the first device, and other physical characteristics of the first device. For example, the first device may determine to change configurations to improve a thermal performance of the first device (or of the second device with which the first device is communicating).

According to the techniques described herein, the first device may communicate with the second device, and the first device may determine to change state, for example, based on a metric (e.g., a performance metric, a signal quality metric, or the like) satisfying a particular condition (e.g., the metric exceeding a corresponding threshold) associated with the communications between the first device and the second device. The first device may transmit a signal including a state change request to the second device to indicate that the first device is changing state to use a different configuration, for example, to use a different antenna configuration (e.g., a configuration for a different set of antenna elements) with an increased or decreased number of antenna elements or a different QCL configuration. Based on the signal indicating the state change of the first device, the second device may correspondingly adjust one or more parameters or configurations for its antenna array. For example, the second device may increase or decrease an MCS or transmit power to utilize an increased or decreased available link budget according to the new configuration indicated by the first device. The second device may transmit a signal back to the first device indicating its respective adjustment for its antenna arrays, and the first device and the second device may communicate according to the updated configurations.

Aspects of the disclosure are initially described in the context of wireless communications systems. Examples of antenna modules, groups of antenna elements, and a process flow are then described. Aspects of the disclosure are further illustrated by and described with reference to apparatus diagrams, system diagrams, and flowcharts that relate to adjusting communications operations for changes to configurations for QCL and number of antenna elements.

FIG. 1 illustrates an example of a wireless communications system 100 that supports adjusting communications operations for changes to configurations for QCL and number of antenna elements in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, IAB nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 Megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-s-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communication with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communications technologies that allow devices to communicate with one another or a base station 105 without human intervention. In some examples, M2M communications or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communications or group communications and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 MHz to 300 GHz. The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communication between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from EHF band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communication with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have one or more of a highest signal strength, SNR, SINR, RSS, RSRP, RSRQ, or other acceptable signal quality based on listening according to multiple beam directions).

A UE 115 may include one or more antenna modules that may each include a relatively large number of antenna elements for mmW communications. A UE communications manager 101 may manage mmW communications, and in some cases may use the techniques described herein to communicate with a second device (e.g., a base station 105). In some cases, the UE 115 may determine to change a configuration state, for example, based on a metric (e.g., a performance metric, a signal quality metric, etc.) satisfying a particular condition (e.g., the metric exceeding a corresponding threshold). The UE 115 may transmit a signal to the second device to indicate that the UE 115 is changing state to use a different configuration, for example, to use a different antenna configuration with an increased or decreased number of antenna elements or a different QCL configuration.

One or more of the base stations 105 may be an example of a second device as discussed herein and may include a base station communications manager 102. The base station communications manager 102 may receive the signal indicating the state change of the UE 115 and may correspondingly adjust one or more parameters, a configuration, or both, for one or more sets of antenna elements of the second device. The base station communications manager 102 may transmit a signal back to the UE indicating the adjustment performed for the sets of antenna elements of the second device, and the first device and the second device may communicate according to the updated configurations.

Figure 2:
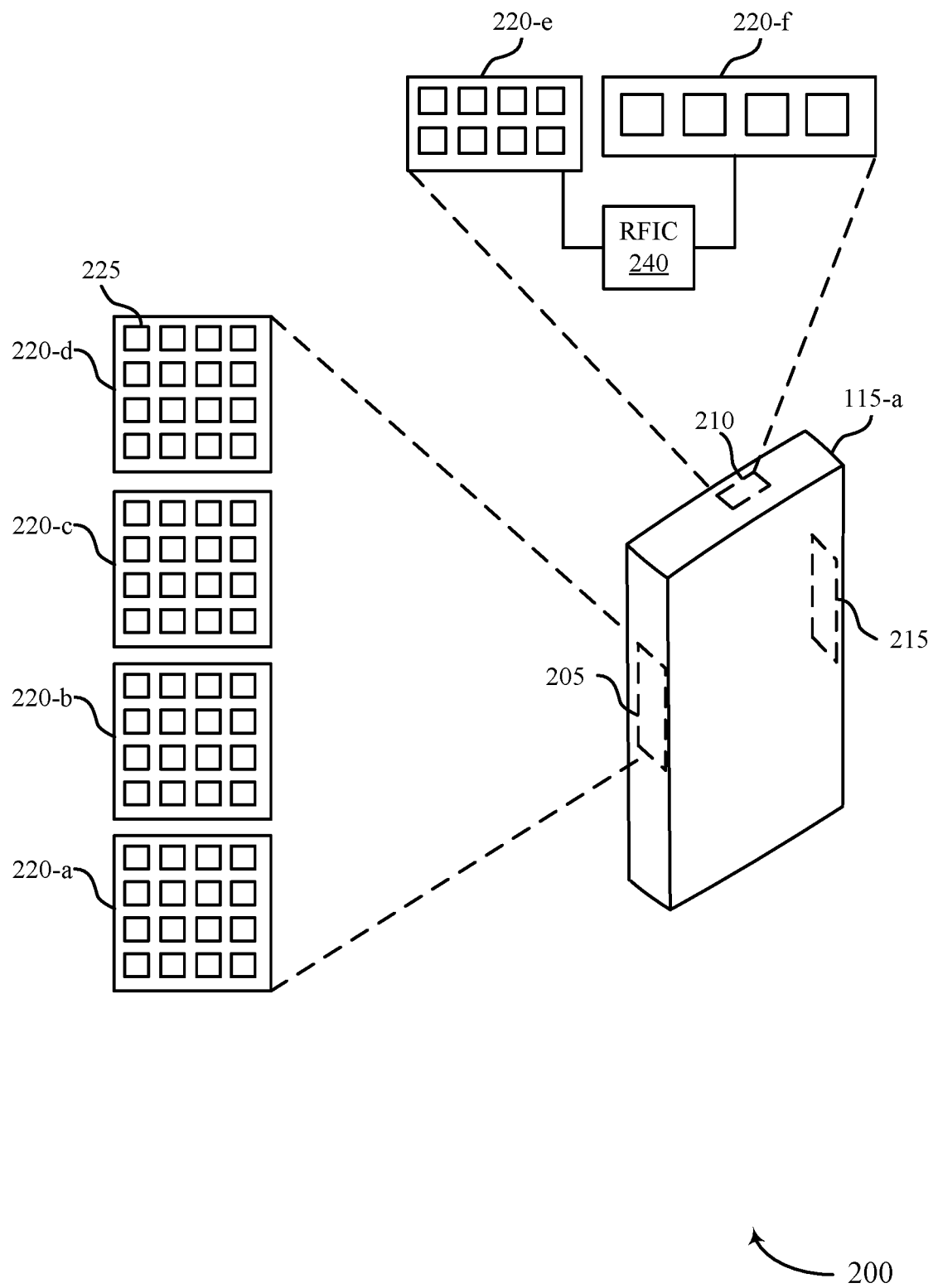
FIG. 2 illustrates an example of a communications device that supports adjusting communications operations for changes to configurations for QCL and number of antenna elements in accordance with one or more aspects of the present disclosure.

FIG. 2 illustrates an example of a communications device 200 that supports adjusting communications operations for changes to configurations for QCL and number of antenna elements 225 in accordance with one or more aspects of the present disclosure. In some examples, a communications device 200 with multiple antenna arrays may implement aspects of wireless communications system 100. In this example, the communications device is illustrated as a UE 115-a, although in other cases the communications device may be a different device, such as a CPE, a relay device, a router, a repeater, or an IAB node.

In this example, the UE 115-a includes a number of different antenna modules, including a first antenna module 205, a second antenna module 210, and a third antenna module 215. Each of the antenna modules 205, 210, and 215 may include an antenna array, which may in turn include a number of subarrays 220 of antenna elements 225. In the illustrative example of FIG. 2, the first antenna module 205 may include four subarrays 220, including a first subarray 220-a, a second subarray 220-b, a third subarray 220-c, and a fourth subarray 220-d. Each subarray 220 in this example may include 16 individual antenna elements 225 arranged in a 4×4 antenna configuration. In some cases, each of the antenna elements 225 may be a patch antenna configured to communicate in a high-band mmW deployment. In some cases, the spacing of antenna elements 225 within each subarray 220 may be configured to provide for efficient analog beamforming at wavelengths associated with high-band mmW communications.

In the illustrative example of FIG. 2, the first antenna module 205 is illustrated as having four subarrays 220, where each subarray 220 has a 4×4 configuration of antenna elements 225. The second antenna module 210 also may include one or more respective subarrays 220, such as a fifth subarray 220-a and a sixth subarray 220-f. As shown in the illustrative example of FIG. 2, the fifth subarray 220-e includes a set of eight antenna elements 225 arranged in a 4×2 configuration, and the sixth subarray 220-f includes a set of four antenna elements 225 arranged in a 4×1 configuration. These configurations for sets of antenna arrays may, in some cases, alternatively be referred to as antenna configurations, antenna element configurations, antenna array configurations, and other similar terms.

As is shown in the illustrative example of FIG. 2, a radio-frequency integrated circuit (RFIC) 240 (e.g., operating according to a configured protocol, such as RFIC5) may be coupled with the fifth subarray 220-e and the sixth subarray 220-f. In some cases, multiple RFICs may be used or an RFIC may be shared with one or more other of the antenna modules 205 or 215. While the antenna module 210 is illustrated as having multiple subarrays 220 that are different sizes, in other examples, the antenna module 210 may be configured with a number of subarrays 220 where each subarray 220 is of a same size (e.g., four 4×4 antenna subarrays 220, as is similarly illustrated with respect to the first antenna module 205). According to the techniques described herein, communications devices 200 may include and implement the described techniques using any number or numbers of antenna modules 205 through 215, the antenna modules 205 through 215 may include any number or numbers of subarrays 220, the subarrays 220 may each include one or more sets of antenna elements 225, and each set of antenna elements 225 of the subarrays 220 may include any number or numbers of antenna elements 225 per subarray 220, and any like combination thereof.

Techniques as discussed herein may be applied to any number or numbers of antenna modules 205 through 215, any number or numbers of subarrays 220 included in each antenna module, any number or numbers of antennas per subarray 220, or any combinations thereof. For example, in an FR2 deployment, a wireless device may be configured with relatively small antenna arrays (e.g., a 4×1 to 6×1 configuration of antenna elements 225). Alternatively, in other deployments, a wireless device may be configured with relatively large antenna arrays (e.g., for use in deployments at sub-6 GHz or mmW carrier frequencies). Such relatively large antenna arrays may be used at a base station, in which case the antenna arrays may have relatively less stringent physical constraints (e.g., power, thermal, or other physical constraints).

In other deployments, however, a wireless communications device 200, such as the UE 115-a, may utilize these relatively large antenna arrays. These devices (e.g., a CPE, a relay device, a router, a repeater, an IAB node, etc.) may have varied capabilities and configurations (e.g., form factors). These devices may, for example, be powered at times by a battery power source, may be configured in a mobile form factor, may have particular size constraints, and the like, such that improvements to power and thermal efficiency may be beneficial (e.g., to provide a longer operating life before recharging a battery).

In some cases, the UE 115-a may operate according to a particular configuration for its antenna arrays and subarrays. For example, the UE 115-a may operate according to a chosen TCI state with reference to a second device with which the UE 115-a may communicate (e.g., a TCI state to be used at a base station). According to a particular TCI state, the UE 115-a may use a given subset of the antenna elements 225 of particular ones of the subarrays 220 of the UE 115-a. Additionally or alternatively, in some cases, a QCL configuration may indicate given QCL information or spatial relation information (such as different QCL types). QCL information may indicate that different signals may have a QCL relationship (e.g., that antenna ports used for transmitting respective signals may share one or more characteristics, such as one or more spatial characteristics). For example, a physical downlink shared channel (PDSCH) and a PDCCH that share beam characteristics such that one can be derived from the other may be referred to as having a QCL relationship (which may be referred to as being "QCLed"). That is, the beam characteristics of the PDCCH obtained from knowledge of the beam characteristics of the PDSCH and the QCL relationship (or vice versa). In the example of FIG. 2, the antenna elements 225 of each subarray 220 may be QCL antenna elements 225. For example, a first QCL configuration associated with subarray 220-*a* may indicate that signals received at each antenna element 225 of subarray 220-*a* may have a QCL relationship (e.g., each antenna element 225 of subarray 220-*a* may share one or more characteristics, such as spatial characteristics).

In some cases, the UE 115-*a* may suggest (e.g., to a base station) a change in state (e.g., TCI state) to account for various conditions. For example, in such a state change, the UE 115-*a* may change its antenna configuration (or antenna array configuration) to use a different number of antenna elements 225. Additionally or alternatively, in a state change, the UE 115-*a* may suggest a change in its QCL configuration to use a set of antenna elements 225 having a different QCL relationship. Such a state change, including a change of QCL configuration or antenna configuration (e.g., number of antenna elements 225 to be used), may correspond to the UE 115-*a* switching to a new beam (e.g., to communicate with another communications device, such as a different base station or transmission point, or to target a different clusters or rays or paths within the same channel with the base station or transmitter node). The UE 115-*a* may switch beams in this way based on the occurrence of various conditions or situations. In some cases, a condition for the UE 115-*a* to switch beams may be based on a signal quality, throughput, or other communication metric. For example, the UE 115-*a* may measure a signal quality metric (e.g., SNR, SINK, RSS, RSRP, RSRQ, etc.), and the UE 115-*a* may determine that the measured value for the signal quality metric exceeds a configured (e.g., preconfigured) value, such as a signal quality threshold. Based on the measured value of the signal quality metric exceeding the signal quality threshold, for example, the UE 115-*a* may accordingly change state to use a new QCL configuration or antenna elements 225, where the new configuration may provide an improved signal quality or other like performance improvement. Such a change in conditions may occur due to changing channel conditions, physical interference or blockage, and other dynamic conditions in the vicinity or wireless network of the UE 115-*a*. For example, if signal quality degrades, the UE 115-*a* may switch to a new configuration to increase a link budget to increase the likelihood that the UE 115-*a* can successfully transmit and receive transmissions.

Additionally or alternatively, the UE 115-*a* may determine to change configurations based on a thermal characteristic of the UE 115-*a*, a power characteristic of the UE 115-*a*, and other like physical characteristics of the UE 115-*a* that may change over time (e.g., for improvements to power or rate control for communications). For example, the UE 115-*a* may identify that a thermal metric exceeds a corresponding threshold (e.g., a thermal performance threshold), and the UE 115-*a* may determine to change state to use a new QCL configuration or antenna elements 225 to achieve an improved thermal performance (or, e.g., battery performance, etc.). Additionally or alternatively, the UE 115-*a* may identify a metric (e.g., pertaining to signal quality, throughput, thermal performance, etc.) of a device with which the UE 115-*a* is communicating, and the UE 115-*a* may change state based on the metric of the other device. For example, to improve performance at a nearby node with which the UE 115-*a* is communicating, the UE 115-*a* may determine to change configurations to improve a thermal performance while potentially reducing throughput for communication with the node. Conversely, the UE 115-*a* may determine to change configurations to improve signal quality or throughput while potentially reducing thermal performance of the node.

According to the techniques described herein, the UE 115-*a* may be communicating with a second device (e.g., a base station), and the UE 115-*a* may determine to change state, for example, based on a metric (e.g., a performance metric, a signal quality metric, etc.) satisfying a particular condition (e.g., the metric exceeding a corresponding threshold). The UE 115-*a* may transmit a signal to the second device to indicate that the UE 115-*a* is changing state to use a different configuration, such as to using a different antenna configuration using an increased or decreased number of antenna elements 225 or a different QCL configuration. The signal may indicate a grouping of antenna elements 225 used, a number of antenna elements used, a QCL configuration used, or a combination thereof. Based on the signal indicating the state change of the UE 115-*a*, the second device may adjust one or more parameters, a configuration, or both, for its own antenna array. Accordingly, the techniques described herein may provide improved communication reliability and link quality between communications devices.

Figure 3:
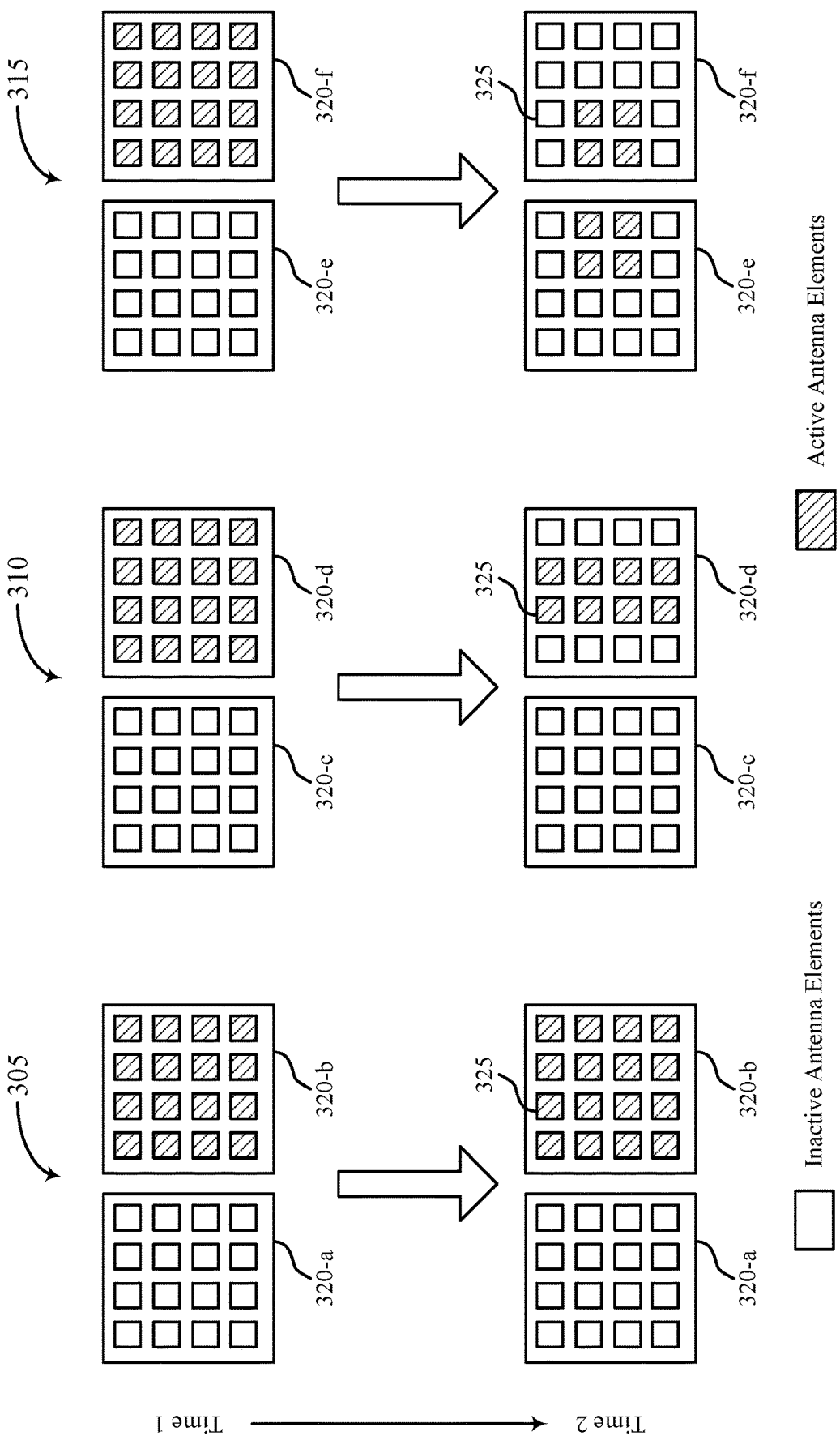
FIG. 3 illustrates example configurations of an antenna array that supports adjusting communications operations for changes to configurations for QCL and number of antenna elements in accordance with one or more aspects of the present disclosure.

FIG. 3 illustrates example configurations 300 of an antenna array that supports adjusting communications operations for changes to configurations for QCL and number of antenna elements in accordance with one or more aspects of the present disclosure. In some examples, the example configurations 300 of the antenna array may implement aspects of the wireless communications system 100, as described with reference to FIG. 1. The configurations 300 of FIG. 3 show the example changes of antenna configurations according to three examples, including a first example 305, a second example 310, and a third example 315. Each of the examples 305, 310, and 315 shows an antenna array including two antenna subarrays 320, which may each be examples of aspects of the antenna modules of the communications device 200, such as a UE, as described with reference to FIG. 2. Each of the antenna subarrays 320 is shown as a 4×4 subarray including 16 antenna elements 325, although any other like configuration of antenna elements 325 is similarly contemplated. The examples 305, 310, and 315 show a transition from a first time ("Time 1") to a second time ("Time 2"), where Time 2 is after Time 1, as indicated by the directional arrow.

In the first example 305, an antenna array of a UE may include a first antenna subarray 320-*a* and a second antenna subarray 320-*b*. At Time 1, the UE may be communicating using a beam formed by using each of the 16 antenna elements 325 of the second antenna subarray 320-*b* and none of the antenna elements 325 of the first antenna subarray 320-*a*. As such, signals received at or transmitted by each of the 16 antenna elements 325 of the second antenna subarray 320-*b* may share a QCL relationship. The UE may determine whether to perform a state change, for example, according to one or more of a signal quality metric, a thermal characteristic, a power characteristic, or other metric, as described herein. According to the first example 305, the UE may determine that the transmission beam provides the UE sufficient performance (e.g., by identifying that a metric satisfies (or falls below) a corresponding threshold), and thus the UE may determine to continue transmitting using the same antenna elements 325 of the second antenna subarray 320-*b* at Time 2 while the antenna elements 325 of the first antenna subarray 320-*a* may remain inactive. Thus, in the first example 305, the UE may not change a QCL configuration or change a number of antenna elements 325. The QCL configuration may not change because the UE may continue transmitting using the same set of antenna elements 325 of the second antenna subarray 320-*b* at Time 2.

In the second example 310, an antenna array of a UE may include a first antenna subarray 320-*c* and a second antenna subarray 320-*d*. At Time 1, the UE may be communicating using a beam formed by using each of the 16 antenna elements 325 of the second antenna subarray 320-*d* and none of the antenna elements 325 of the first antenna subarray 320-*c*. The UE may determine whether to perform a state change, for example, according to a signal quality metric, a thermal characteristic, a power characteristic, or other metric, as described herein. According to the second example 310, the UE may determine to change the transmission beam from the configuration at Time 1 (e.g., based on identifying that a metric falls below (or exceeds) a corresponding threshold). Accordingly, the UE may determine a new antenna configuration (e.g., antenna array configuration). For example, as shown in the second example 310, the UE may determine to use a 4×2 configuration of antenna elements 325 of the second antenna subarray 320-*d* at Time 2 (e.g., to reduce power consumption or thermal output at the UE). Thus, in the second example 310, the UE may not change a QCL configuration but may change an antenna configuration to decrease a number of active antenna elements 325. The QCL configuration of the UE may not change because the 4×2 configuration of antenna elements 325 of the second antenna subarray 320-*d* may include antenna elements that were previously used by the UE. Thus, the QCL relationship between signals transmitted by or received at the antenna elements 325 may be maintained.

In the third example 315, an antenna array of a UE may include a first antenna subarray 320-*e* and a second antenna subarray 320-*f*. At Time 1, the UE may be communicating using a beam formed by using each of the 16 antenna elements 325 of the second antenna subarray 320-*f* and none of the antenna elements 325 of the first antenna subarray 320-*e*. The UE may determine whether to perform a state change, for example, according to a signal quality metric, a thermal characteristic, a power characteristic, or other metric, as described herein. According to the third example 315, the UE may determine to change the transmission beam from the configuration at Time 1 (e.g., based on identifying that a metric falls below (or exceeds) a corresponding threshold). Accordingly, the UE may determine a new antenna configuration. For example, as shown in the third example 315, the UE may determine to use, at Time 2, a 2×4 configuration of the antenna elements 325 of both the first antenna subarray 320-*e* and the second antenna subarray 320-*f*. In activating antenna elements 325 of the first antenna subarray 320-*e*, the UE may change a QCL relationship of the beams at Time 2 with respect to Time 1 (e.g., because a QCL configuration of the antenna elements 325 of the first antenna subarray 320-*e* may be different from a QCL configuration of the antenna elements 325 of the second antenna subarray 320-*f*). Thus, in the third example 315, the UE may change both of a QCL configuration and an antenna configuration, for example, while decreasing a number of active antenna elements 325.

According to the second example 310 and the third example 315, the UE may transmit a signal to a second device (e.g., a second device with which the UE was communicating at Time 1 and Time 2) to indicate a new configuration (e.g., QCL configuration or antenna configuration) for the UE. This may indicate that the UE is changing state to use a new configuration, such as to using a different antenna configuration using an decreased (or, in other examples, increased) number of antenna elements or a different QCL configuration. Based on the signal indicating the state change of the UE, the second device may also adjust one or more parameters, a configuration, or both, for an antenna array of the second device. For example, the second device may increase or decrease an MCS or transmit power to utilize a decreased (or, in other examples, increased) link budget according to the new configuration indicated by the UE. According to the techniques described herein, the second device may transmit a signal back to the UE indicating the respective adjustment at the second device, and the UE and the second device may communicate according to the updated configurations. Accordingly, the techniques described herein may provide improved communication reliability and link quality between communications devices.

Figure 4:
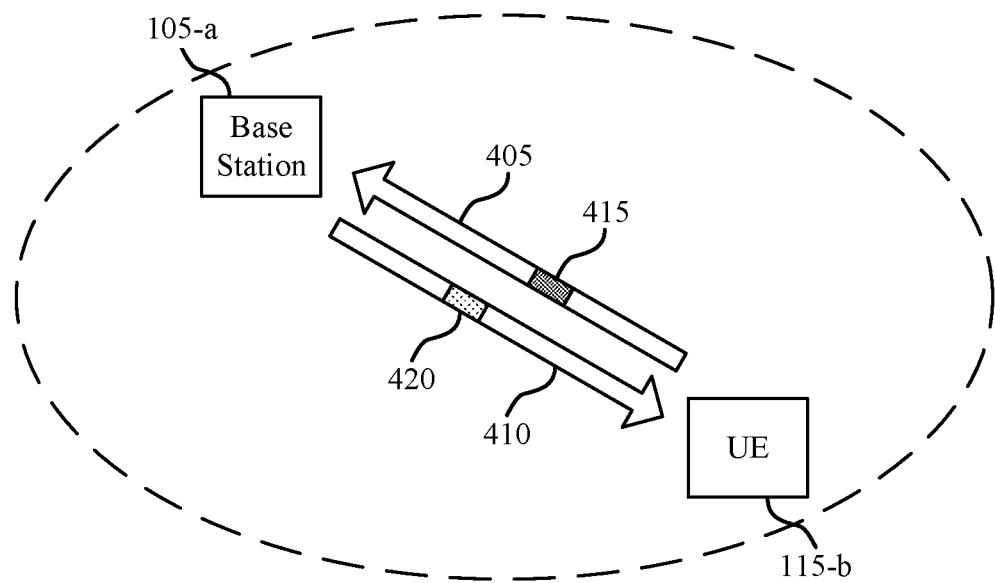
FIG. 4 illustrates an example of a wireless communications system that supports adjusting communications operations for changes to configurations for QCL and number of antenna elements in accordance with one or more aspects of the present disclosure.

FIG. 4 illustrates an example of a wireless communications system 400 that supports adjusting communications operations for changes to configurations for QCL and number of antenna elements in accordance with one or more aspects of the present disclosure. In some examples, the wireless communications system 400 may implement aspects of the wireless communications system 100, as described with reference to FIG. 1. In some examples, the wireless communications system 400 may include a base station 105-*a* and a UE 115-*b*, which may be examples of base stations 105 UEs 115 as described with reference to FIGS. 1 through 3. Further, the UE 115-*b* may be an example of a first device, and the base station 105-*a* may be an example of a second device, as described herein. The UE 115-*b* and the base station 105-*a* may communicate using beamformed communications in which the UE 115-*b* transmits uplink communications 405 to the base station 105-*a*, and the base station 105-*a* transmits downlink communications 410 to the UE 115-*b*.

In some cases, the UE 115-*b* may include a relatively large number of antenna elements, which may be spread across one or more antenna subarrays and one or more antenna modules of the UE 115-*b*. As similarly described herein, the UE 115-*b* may determine to change state, for example, based on a metric (e.g., a performance metric, a signal quality metric, etc.) satisfying a particular condition (e.g., the metric exceeding a corresponding threshold). The UE 115-*b* may transmit a signal including a state change request 415 to the base station 105-*a* to indicate that the UE 115-*b* is changing state to use a different configuration, such as to using a different antenna configuration (e.g., antenna array configuration) using an increased or decreased number of antenna elements or a different QCL configuration (e.g., correspondingly increasing or decreasing an available link budget for communication between the UE 115-*b* and the base station 105-*a*). The state change request 415 may indicate to the base station 105-*a* to correspondingly update a configuration to utilize the updated (e.g., increased or decreased) link budget. For example, a greater number of antenna elements may provide a relatively increased equivalent isotropically radiated power (EIRP) for transmissions from the UE 115-*b*, which may correspondingly provide a relatively increased link budget for communication between the UE 115-*b* and the base station 105-*a*.

Based on the state change request 415 indicating the state change of the UE 115-*b*, the base station 105-*a* may adjust one or more parameters, a configuration, or both, for a communication beam of an antenna array of the base station 105-*a*. For example, the indicated configuration may indicate that the base station 105-*a* may use a configuration with an increased coding rate or transmit power. Accordingly, the base station 105-*a* may perform an adjustment to increase an MCS or transmit power to utilize the increased link budget that is available according to the updated configuration indicated by the UE 115-*b* via the state change request 415. For example, the base station 105-*a* may increase the MCS from 16 Quadrature Amplitude Modulation (16QAM) to 64 Quadrature Amplitude Modulation (64QAM), as accommodated by the greater link budget.

In some cases, in response to receiving the state change request 415 from the UE 115-*b* and adjusting a configuration for an antenna array (or arrays) of the base station 105-*a*, the base station 105-*a* may transmit a response message 420 to the UE 115-*b*. In some cases, the base station 105-*a* may transmit the state change request 415 to the UE 115-*b* in control signaling (e.g., in a control channel transmission such as in an uplink control channel (e.g., a PUCCH), downlink control channel (e.g., a PDCCH), or a sidelink control channel transmission), or in a MAC-CE. Additionally or alternatively, the base station 105-*a* may transmit the state change request 415 to the UE 115-*b* via RRC signaling.

The response message 420 may indicate the particular adjustment or adjustments performed by the base station 105-*a* so that the UE 115-*b* is informed of, for example, the updated MCS with which to use to continue communicating with the base station 105-*a*. Similarly, the response message 420 may indicate an updated transmit power that the UE 115-*b* may use to perform subsequent measurements, for example, to perform additional signal quality measurements based on which the UE 115-*b* may switch state again, as similarly described herein. Accordingly, the UE 115-*b* and the base station 105-*a* may dynamically update and signal QCL configuration and antenna configuration (e.g., antenna array configuration) updates to efficiently configure communication beams to achieve a desired thermal (e.g., battery) performance relative to signal quality and throughput performance.

Figure 5:
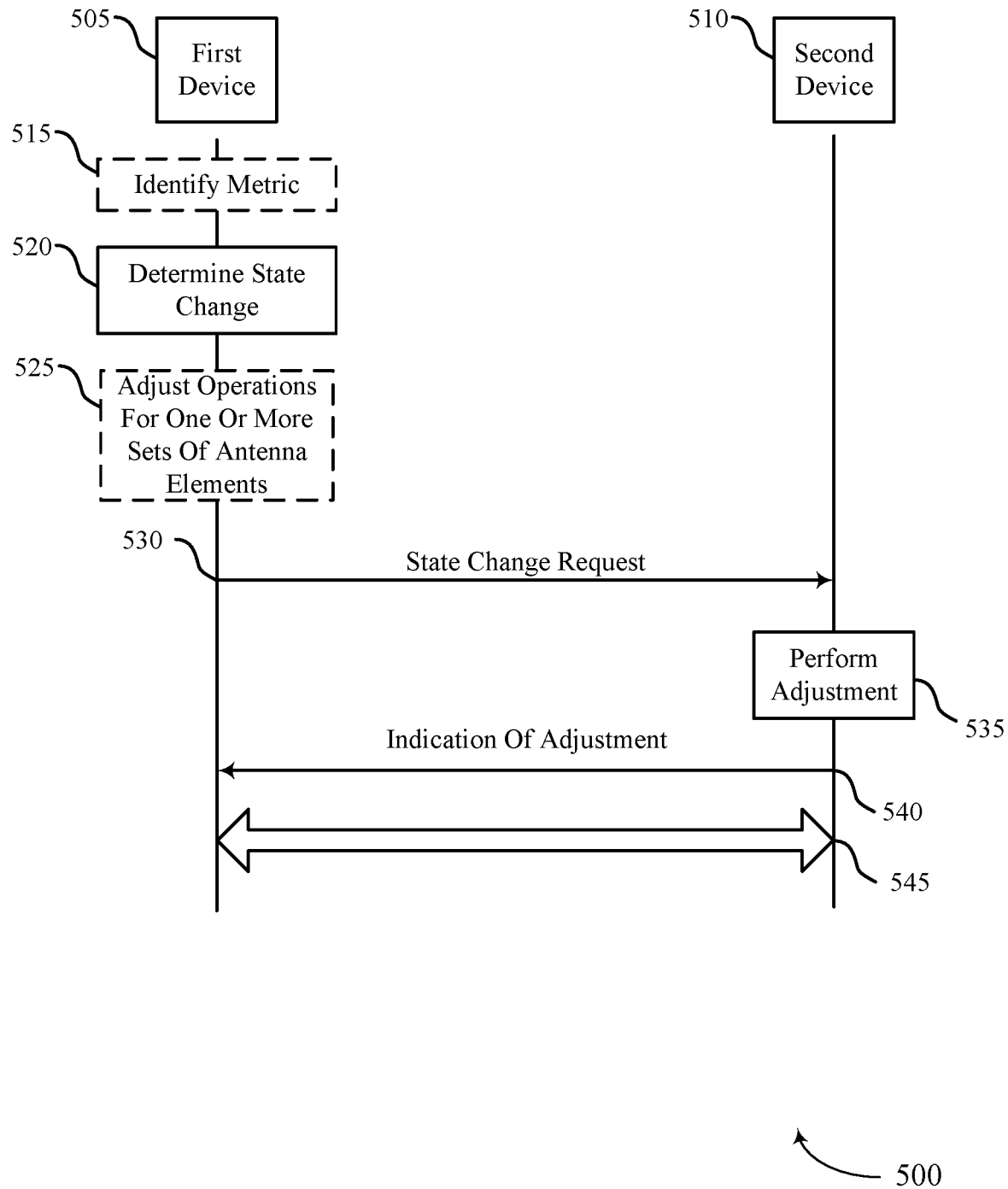
FIG. 5 illustrates an example of a process flow that supports adjusting communications operations for changes to configurations for QCL and number of antenna elements in accordance with one or more aspects of the present disclosure.

FIG. 5 illustrates an example of a process flow 500 that supports adjusting communications operations for changes to configurations for QCL and number of antenna elements in accordance with one or more aspects of the present disclosure. In some examples, the process flow 500 may be implemented by aspects of the wireless communications systems 100 and 400, as described with reference to FIGS. 1 and 4, respectively. The process flow 500 may include a first device 505 and a second device 510, which may be examples of the corresponding devices described with reference to FIGS. 1 and 2. Alternative examples of the following may be implemented, where some steps are performed in a different order than described or are not performed at all. In some examples, steps may include additional features not mentioned below, or further steps may be added. In some cases, the first device 505 may be a UE and the second device 510 may be a base station. Alternatively, the first device 505, the second device 510, or both, may be base stations, CPEs, relay devices, routers, repeaters, IAB nodes, and other like devices.

At 515, the first device 505 may identify a metric associated with communication (e.g., association with a beam) between the first device 505 and the second device 510. In some cases, the metric may be, may include, or may be based on, a signal quality (e.g., SNR, SINR, RSS, RSRP, RSRQ, or other acceptable signal quality metric) associated with communication between the first device 505 and the second device 510 or a thermal or power characteristic of the first device 505 or the second device 510.

At 520, the first device 505 may determine a state change for the first device 505 based on a condition associated with communication between the first device 505 and the second device 510. In some cases, the condition may be based on a change of the metric (e.g., as the first device 505 may have identified at 515). In some cases, the condition may be (or include) a change of the metric exceeding a threshold (e.g., an preconfigured threshold).

At 525, the first device 505 may adjust one or more operations for one or more sets of antenna elements of the first device 505 according to the state change for the first device 505 (e.g., as may have been determined at 520). In some cases, adjusting operations may include increasing or decreasing a number of antenna elements of the one or more sets of antenna elements of the first device 505 that the first device 505 may use to communicate with the second device 510. Additionally or alternatively, adjusting operations may include changing a QCL configuration associated with the one or more sets of antenna elements of the first device 505.

At 530, the first device 505 may transmit to the second device 510, and the second device 510 may receive from the first device 505, a state change request for one or more sets of antenna elements of the second device 510, for example, based on determining the state change at 520.

At 535, the second device 510 may perform an adjustment for one or more sets of antenna elements of the second device 510, where the adjustment may be based on the state change request (e.g., as the first device 505 may have determined at 520 and indicated to the second device in the state change request at 525). In some cases, performing the adjustment may include updating a transmit power at the second device 510 for transmitting to the first device 505, for example, based on the state change request. Additionally or alternatively, performing the adjustment may include updating an MCS for communication between the first device 505 and the second device 510, for example, based on the state change request.

At 540, the second device 510 may transmit to the first device 505, and the first device 505 may receive from the second device 510, an indication of an adjustment for the one or more sets of antenna elements of the second device 515, where, for example, the adjustment may be based on the state change request. In some cases, the indication of the adjustment for the one or more sets of antenna elements of the second device 510 may indicate an updated transmit power at the second device 510 for transmitting to the first device 505 (e.g., as the second device 510 may have performed in the adjustment at 535). Additionally or alternatively, the indication of the adjustment for the one or more sets of antenna elements of the second device 510 may indicate an updated MCS for the communication between the first device 505 and the second device 510 (e.g., as the second device 510 may have performed in the adjustment at 535). In some cases, the indication of the adjustment for the one or more sets of antenna elements of the second device may be communicated via a PDCCH or a PUCCH. Additionally or alternatively, the indication of the adjustment for the one or more sets of antenna elements of the second device may be communicated via DCI, a MAC-CE, or RRC signaling.

At 545, the first device 505 may communicate with the second device 510 based on the adjustment for the one or more sets of antenna elements of the second device 510, for example, as the second device 510 may have performed at 535.

Figure 6:
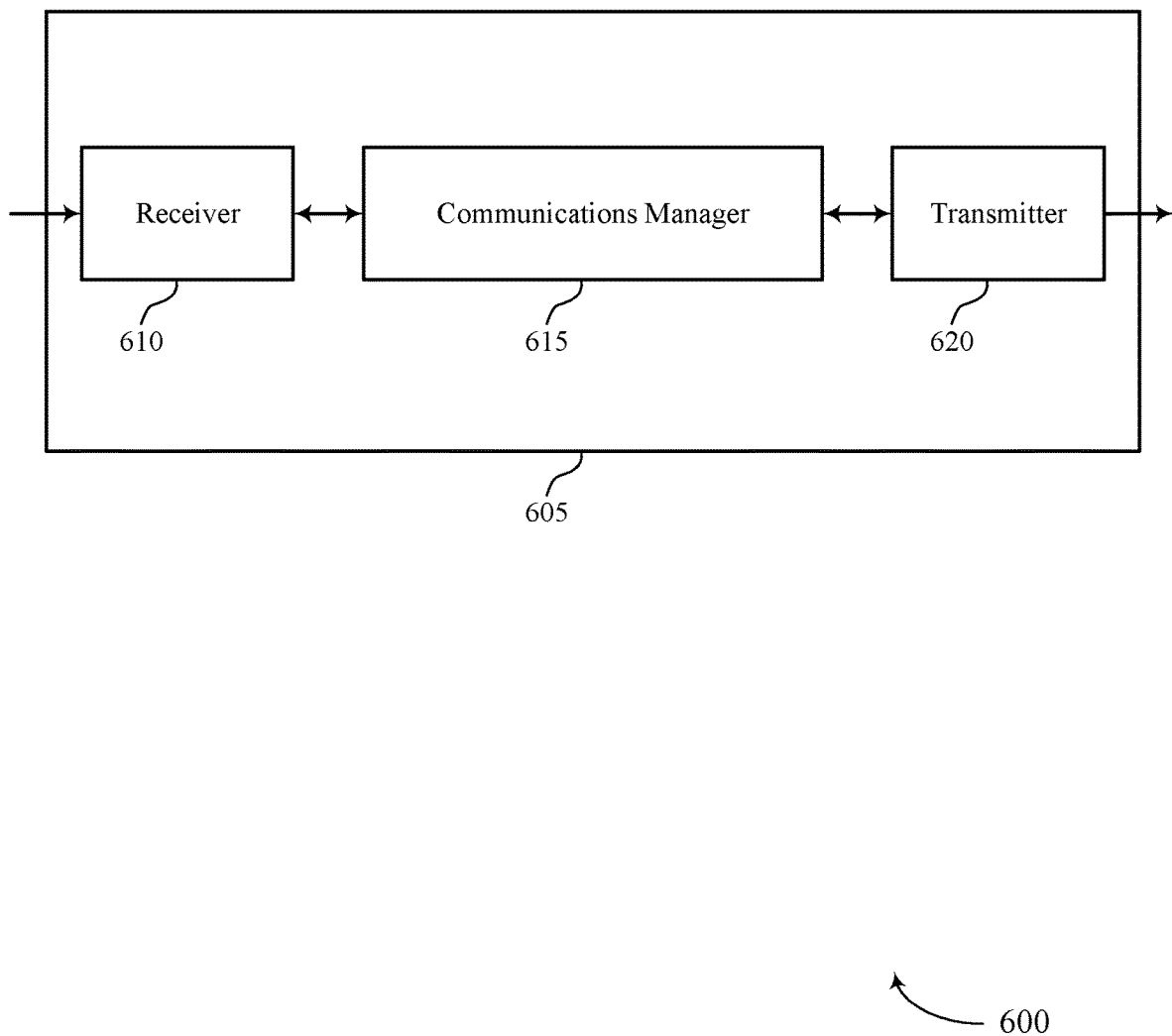
FIGS. 6 and 7 show block diagrams of devices that support adjusting communications operations for changes to configurations for QCL and number of antenna elements in accordance with one or more aspects of the present disclosure.

FIG. 6 shows a block diagram 600 of a device 605 that supports adjusting communications operations for changes to configurations for QCL and number of antenna elements in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to adjusting communications operations for changes to configurations for QCL and number of antenna elements, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may adjust one or more operations for one or more sets of antenna elements of the first device according to a state change for the first device, transmit, to a second device, a state change request for one or more sets of antenna elements of the second device based on determining the state change for the first device, where the state change is based on a condition associated with communications between the first device and the second device, receive an indication of an adjustment for the one or more sets of antenna elements of the second device, the adjustment based on the state change request, and communicate with the second device based on the adjustment for the one or more sets of antenna elements of the second device. The communications manager 615 may be an example of aspects of the communications manager 910 described herein.

The communications manager 615 may be an example of means for performing various aspects of managing configurations for QCL and number of antenna elements as described herein. The communications manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, a FPGA or other programmable logic device.

In some examples, the communication manager 615 may be configured to perform various operations (e.g., adjusting, transmitting, receiving, communicating) using or otherwise in cooperation with the receiver 610, the transmitter 620, or both.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with one or more aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
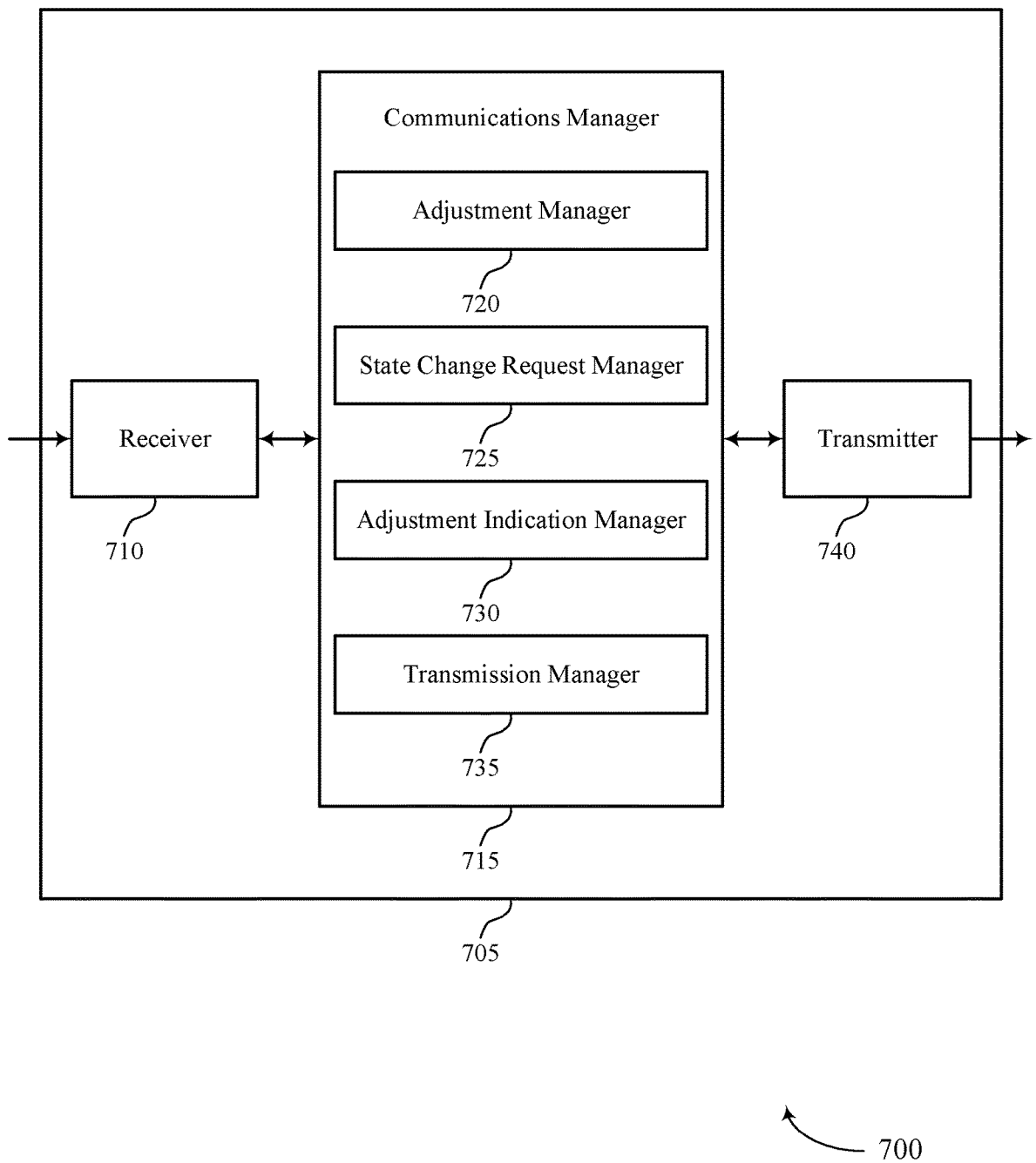

FIG. 7 shows a block diagram 700 of a device 705 that supports adjusting communications operations for changes to configurations for QCL and number of antenna elements in accordance with one or more aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to adjusting communications operations for changes to configurations for QCL and number of antenna elements, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an adjustment manager 720, a state change request manager 725, an adjustment indication manager 730, and a transmission manager 735. The communications manager 715 may be an example of aspects of the communications manager 910 described herein.

The adjustment manager 720 may adjust one or more operations for one or more sets of antenna elements of the first device according to a state change for the first device.

The state change request manager 725 may transmit, to a second device, a state change request for one or more sets of antenna elements of the second device based on determining the state change for the first device, where the state change is based on a condition associated with communications between the first device and the second device.

The adjustment indication manager 730 may receive an indication of an adjustment for the one or more sets of antenna elements of the second device, the adjustment based on the state change request.

The transmission manager 735 may communicate with the second device based on the adjustment for the one or more sets of antenna elements of the second device.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
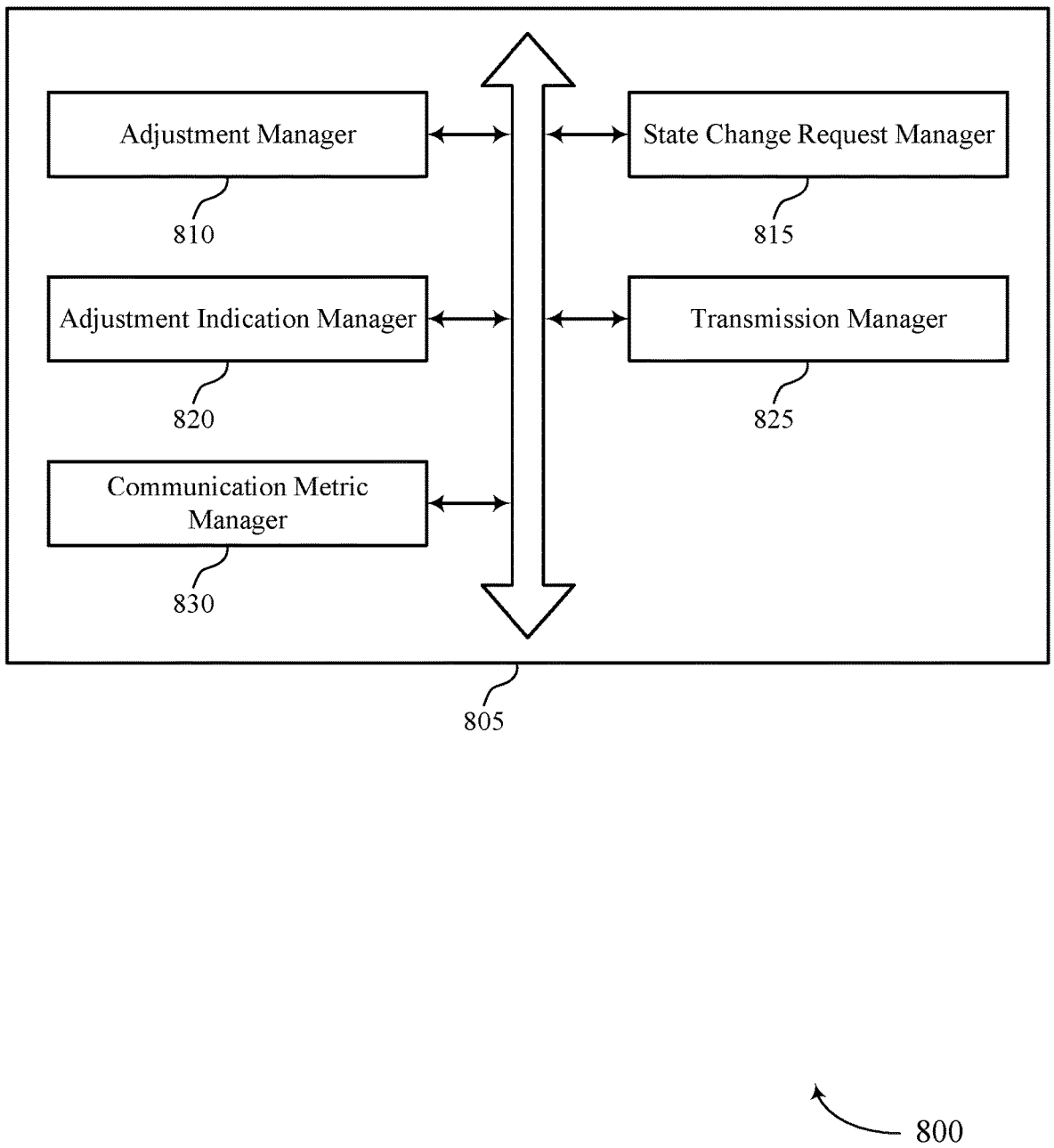
FIG. 8 shows a block diagram of a communications manager that supports adjusting communications operations for changes to configurations for QCL and number of antenna elements in accordance with one or more aspects of the present disclosure.

FIG. 8 shows a block diagram 800 of a communications manager 805 that supports adjusting communications operations for changes to configurations for QCL and number of antenna elements in accordance with one or more aspects of the present disclosure. The communications manager 805 may be an example of aspects of a communications manager 615, a communications manager 715, or a communications manager 910 described herein. The communications manager 805 may include an adjustment manager 810, a state change request manager 815, an adjustment indication manager 820, a transmission manager 825, and a communication metric manager 830. Each of these modules may communicate, directly or indirectly, with one another (e.g., via one or more buses).

The adjustment manager 810 may adjust one or more operations for one or more sets of antenna elements for the first device. In some examples, the adjustment manager 810 may increase or decrease a number of antenna elements of the one or more sets of antenna elements of the first device to be used for communicating with the second device. In some examples, the adjustment manager 810 may change a QCL configuration associated with the one or more sets of antenna elements of the first device for communicating with the second device.

The state change request manager 815 may transmit, to a second device, a state change request for one or more sets of antenna elements of the second device based on determining the state change for the first device, where the state change may be based on a condition associated with communications between the first device and the second device. In some cases, the condition includes the change of the metric exceeding a threshold. In some cases, the condition is based on a thermal characteristic, a power characteristic, or both, of one or more of the first device or the second device.

The adjustment indication manager 820 may receive an indication of an adjustment for the one or more sets of antenna elements of the second device, the adjustment based on the state change request. In some cases, the indication of the adjustment for the one or more sets of antenna elements of the second device indicates an updated transmit power of the second device that is associated with transmissions to the first device. In some cases, the indication of the adjustment for the one or more sets of antenna elements of the second device indicates an updated MCS for the communication between the first device and the second device. In some cases, the indication of the adjustment for the one or more sets of antenna elements of the second device is received via a PDCCH or a PUCCH. In some cases, the indication of the adjustment for the one or more sets of antenna elements of the second device is received via one or more of DCI, a MAC-CE, or RRC signaling.

The transmission manager 825 may communicate with the second device based on the adjustment for the one or more sets of antenna elements of the second device. In some cases, the first device is a UE in a wireless communications system and the second device is a base station in the wireless communications system. In some cases, one or more of the first device or the second device is one of a base station, a CPE, a relay device, a router, a repeater, or an IAB node.

The communication metric manager 830 may identify a metric associated with the communication between the first device and the second device, where the condition is based on a change of the metric. In some cases, the metric includes a signal quality associated with the communication between the first device and the second device.

Figure 9:
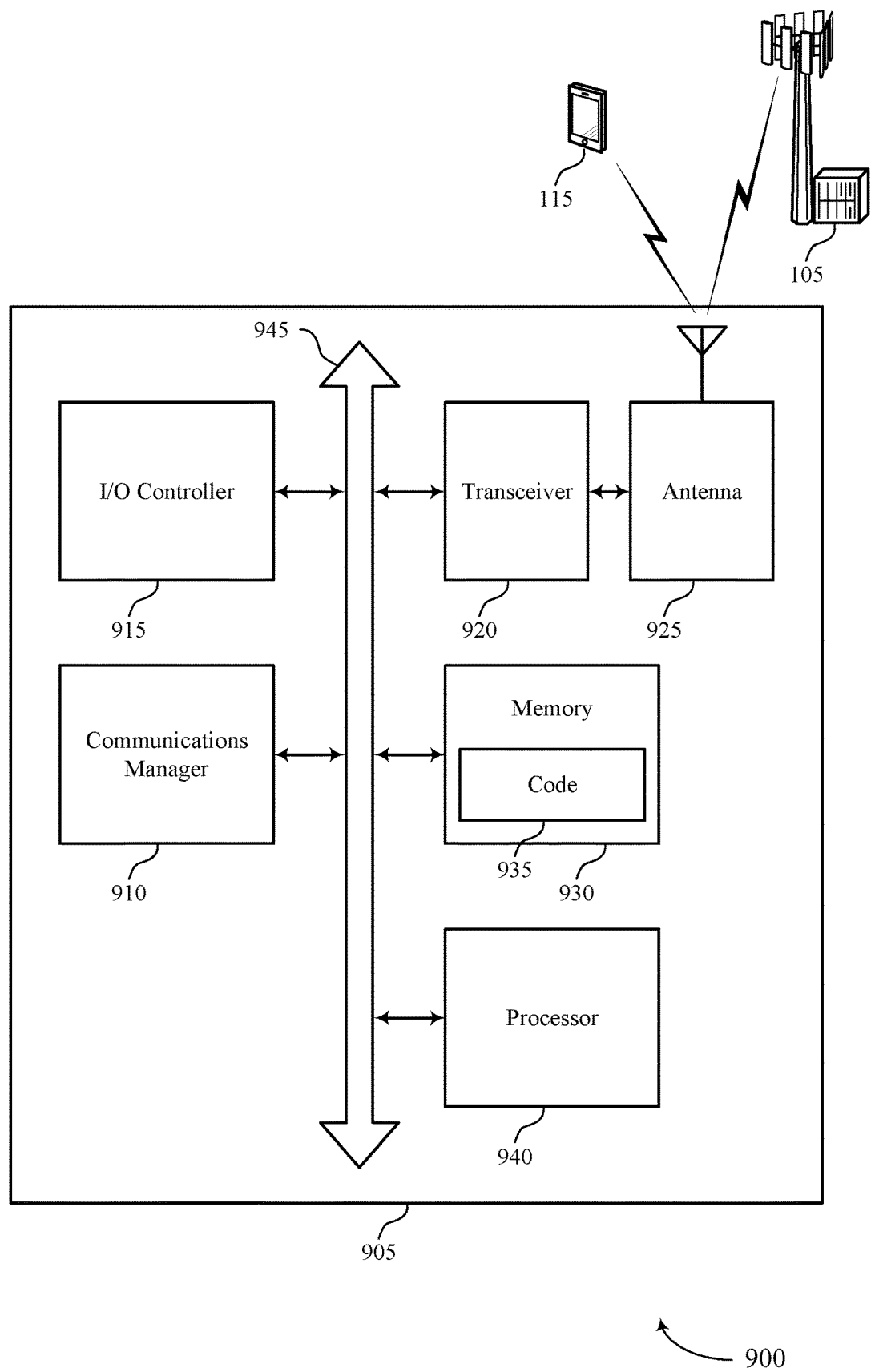
FIG. 9 shows a diagram of a system including a device that supports adjusting communications operations for changes to configurations for QCL and number of antenna elements in accordance with one or more aspects of the present disclosure.

FIG. 9 shows a diagram of a system 900 including a device 905 that supports adjusting communications operations for changes to configurations for QCL and number of antenna elements in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may adjust one or more operations for one or more sets of antenna elements for the first device, transmit, to a second device, a state change request for one or more sets of antenna elements of the second device based on determining the state change for the first device, where the state change may be based on a condition associated with communications between the first device and the second device, receive an indication of adjustments for the one or more sets of antenna elements of the second device, the adjustment based on the state change request, and communicate with the second device based on the adjustment for the one or more sets of antenna elements of the second device.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting adjusting communications operations for changes to configurations for QCL and number of antenna elements).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The actions performed by the communications manager 910 as described herein may facilitate the processor 940 to realize one or more potential improvements in the operations of the device 905. For example, the communications manager 910 may transmit a signal to a second device indicating an updated QCL configuration or antenna configuration (e.g., antenna array configuration) for the first device, which may, for example, increase or decrease a link budget for communication between the first device and the second device. The indication communicated in this signal may indicate that the first device is changing state to use a new configuration, and the second device may then correspondingly adjust one or more parameters, a configuration, or both, of its own antenna array. For example, the second device may increase or decrease an MCS or transmit power to utilize the link budget as may have been increased or decreased according to the new configuration indicated by the first device. The second device may transmit a signal back to the first device indicating its own respective adjustment which may be received at the communications manager 910 of the first device, and the first device and the second device may communicate according to the updated configurations. Accordingly, the techniques described herein may facilitate the first device and the second device to more efficiently signal changes in configurations that may affect the link budget between them. By way of this signaling, the first device and the second device may perform adjustments to, for example, more efficiently utilize an increased link budget or, alternatively, more reliably utilize a decreased link budget.

Figure 10:
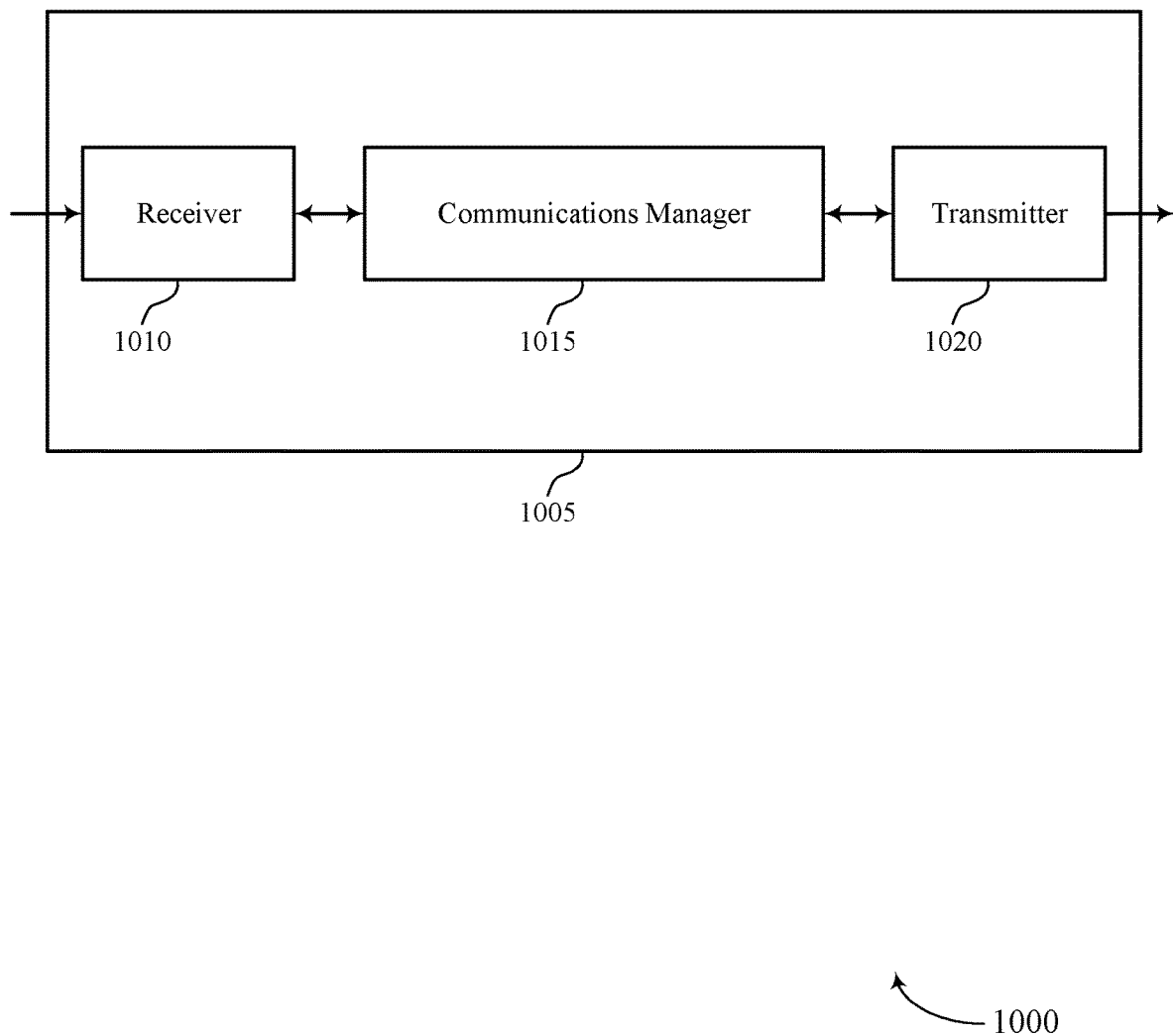
FIGS. 10 and 11 show block diagrams of devices that support adjusting communications operations for changes to configurations for QCL and number of antenna elements in accordance with one or more aspects of the present disclosure.

FIG. 10 shows a block diagram 1000 of a device 1005 that supports adjusting communications operations for changes to configurations for QCL and number of antenna elements in accordance with one or more aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to adjusting communications operations for changes to configurations for QCL and number of antenna elements, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a first device, a state change request for one or more sets of antenna elements of a second device, where the state change request is based on one or more operations for one or more sets of antenna elements of the first device, perform an adjustment for the one or more sets of antenna elements of the second device, the adjustment based on the state change request, transmit, in response to receiving the state change request, an indication of the adjustment for the one or more sets of antenna elements of the second device, and communicate with the first device based on the adjustment for the one or more sets of antenna elements of the second device. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with one or more aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
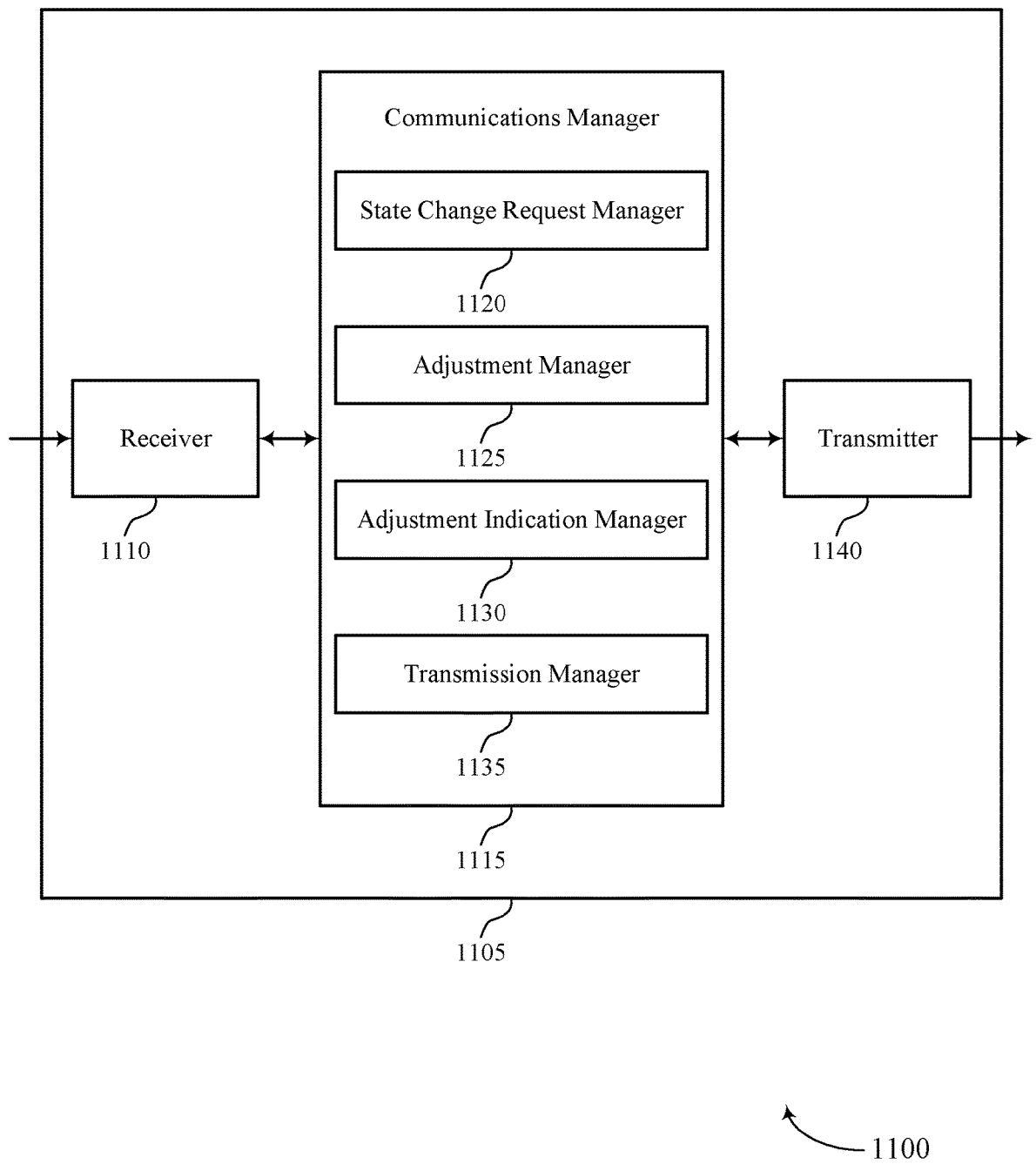

FIG. 11 shows a block diagram 1100 of a device 1105 that supports adjusting communications operations for changes to configurations for QCL and number of antenna elements in accordance with one or more aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to adjusting communications operations for changes to configurations for QCL and number of antenna elements, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a state change request manager 1120, an adjustment manager 1125, an adjustment indication manager 1130, and a transmission manager 1135. The communications manager 1115 may be an example of aspects of the communications manager 1310 described herein.

The state change request manager 1120 may receive, from a first device, a state change request for one or more sets of antenna elements of a second device, where the state change request is based on one or more operations for one or more sets of antenna elements of the first device.

The adjustment manager 1125 may perform an adjustment for the one or more sets of antenna elements of the second device, the adjustment based on the state change request.

The adjustment indication manager 1130 may transmit, in response to receiving the state change request, an indication of the adjustment for the one or more sets of antenna elements of the second device.

The transmission manager 1135 may communicate with the first device based on the adjustment for the one or more sets of antenna elements of the second device.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
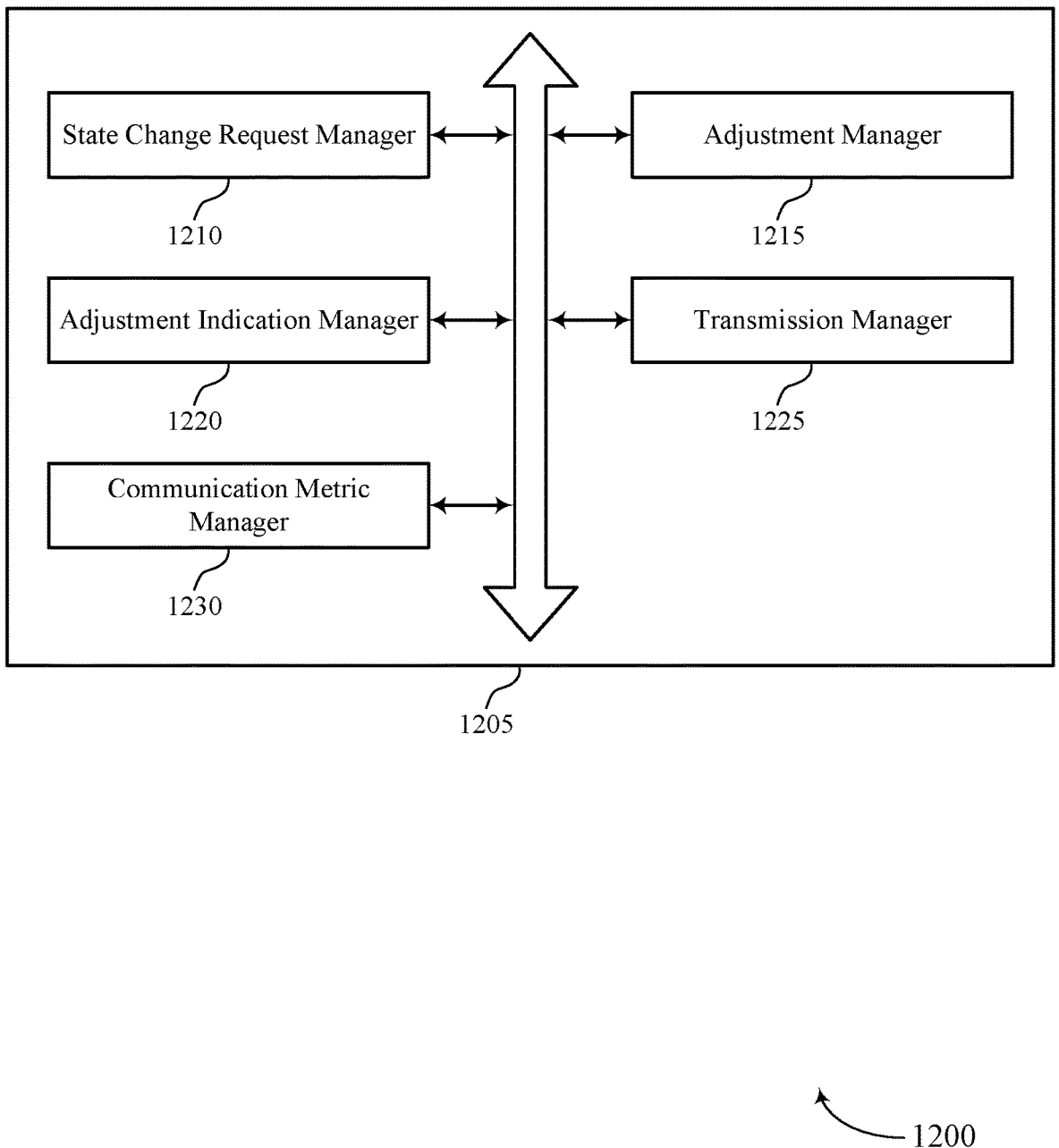
FIG. 12 shows a block diagram of a communications manager that supports adjusting communications operations for changes to configurations for QCL and number of antenna elements in accordance with one or more aspects of the present disclosure.

FIG. 12 shows a block diagram 1200 of a communications manager 1205 that supports adjusting communications operations for changes to configurations for QCL and number of antenna elements in accordance with one or more aspects of the present disclosure. The communications manager 1205 may be an example of aspects of a communications manager 1015, a communications manager 1115, or a communications manager 1310 described herein. The communications manager 1205 may include a state change request manager 1210, an adjustment manager 1215, an adjustment indication manager 1220, a transmission manager 1225, and a communication metric manager 1230. Each of these modules may communicate, directly or indirectly, with one another (e.g., via one or more buses).

The state change request manager 1210 may receive, from a first device, a state change request for one or more sets of antenna elements of a second device, where the state change request is based on one or more operations for one or more sets of antenna elements of the first device. In some cases, the one or more operations for the one or more sets of antenna elements of the first device include an increased or decreased number of antenna elements of the one or more sets of antenna elements of the first device to be used for communicating with the second device. In some cases, the one or more operations for the one or more sets of antenna elements of the first device include a changed QCL configuration associated with the one or more sets of antenna elements of the first device for communicating with the second device.

The adjustment manager 1215 may perform an adjustment for the one or more sets of antenna elements of the second device, the adjustment based on the state change request. In some examples, the adjustment manager 1215 may update a transmit power of the second device based on the state change request, the transmit power associated with transmissions to the first device, where the indication of the adjustment for the one or more sets of antenna elements of the second device indicates the updated transmit power. In some examples, the adjustment manager 1215 may update an MCS for communication between the first device and the second device based on the state change request, where the indication of the adjustment for the one or more sets of antenna elements of the second device indicates the updated MCS.

The adjustment indication manager 1220 may transmit, in response to receiving the state change request, an indication of the adjustment for the one or more sets of antenna elements of the second device. In some cases, the indication of the adjustment for the one or more sets of antenna elements of the second device is transmitted via a PDCCH or a PUCCH. In some cases, the indication of the adjustment for the one or more sets of antenna elements of the second device is transmitted via one or more of DCI, a MAC-CE, or RRC signaling.

The transmission manager 1225 may communicate with the first device based on the adjustment for the one or more sets of antenna elements of the second device. In some cases, the first device is a UE in a wireless communications system and the second device is a base station in the wireless communications system. In some cases, one or more of the first device or the second device is one of a base station, a CPE, a relay device, a router, a repeater, or an IAB node.

The communication metric manager 1230 may base the state change request on a condition associated with a metric associated with communication between the first device and the second device. In some cases, the condition includes a change of the metric exceeding a threshold. In some cases, the metric includes a signal quality associated with the communication between the first device and the second device. In some cases, the condition is based on a thermal characteristic, a power characteristic, or both, of one or more of the first device or the second device.

Figure 13:
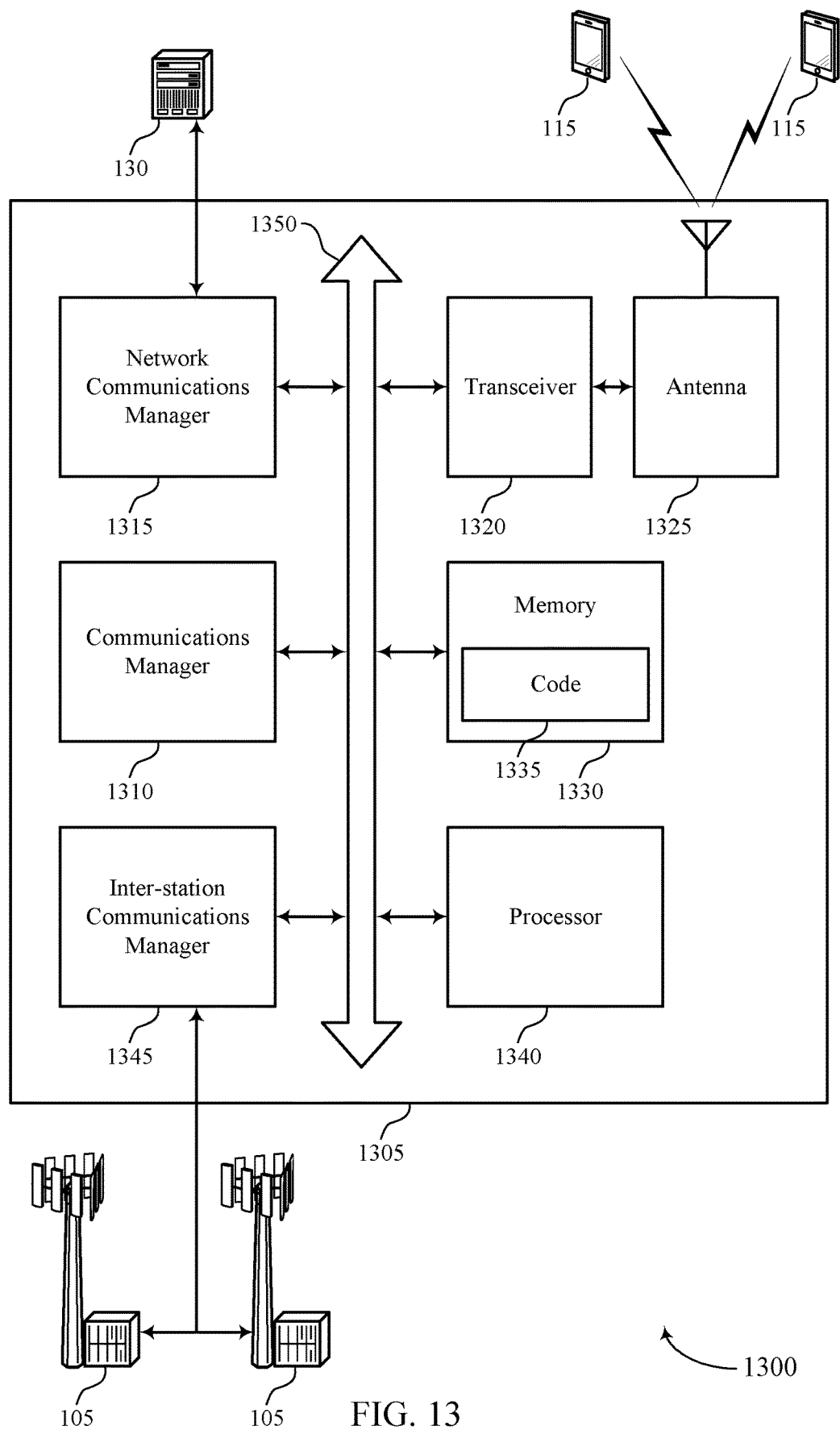
FIG. 13 shows a diagram of a system including a device that supports adjusting communications operations for changes to configurations for QCL and number of antenna elements in accordance with one or more aspects of the present disclosure.

FIG. 13 shows a diagram of a system 1300 including a device 1305 that supports adjusting communications operations for changes to configurations for QCL and number of antenna elements in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a first device, a state change request for one or more sets of antenna elements of a second device, where the state change request is based on one or more operations for one or more sets of antenna elements of the first device, perform an adjustment for the one or more sets of antenna elements of the second device, the adjustment based on the state change request, transmit, in response to receiving the state change request, an indication of the adjustment for the one or more sets of antenna elements of the second device, and communicate with the first device based on the adjustment for the one or more sets of antenna elements of the second device.

The network communications manager 1315 may manage communication with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting adjusting communications operations for changes to configurations for QCL and number of antenna elements).

The inter-station communications manager 1345 may manage communication with other base station 105, and may include a controller or scheduler for controlling communication with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The actions performed by the communications manager 1310 as described herein may facilitate the processor 1340 to realize one or more potential improvements in the operations of the device 1305. For example, a first device may transmit a signal to the second device, which may be received by the communications manager 1310 of the second device. The signal may indicate an updated QCL configuration or antenna configuration (e.g., antenna array configuration) for the first device, which may, for example, increase or decrease a link budget for communications between the first device and the second device. The indication communicated in this signal may indicate that the first device is changing state to use a new configuration, and the communications manager 1310 of the second device may correspondingly adjust one or more parameters, a configuration, or both, for one or more sets of antenna elements of the second device. For example, the communications manager 1310 may increase or decrease an MCS or transmit power for the second device to utilize the link budget as may have been increased or decreased according to the new configuration indicated by the first device. The second device may, via the communications manager 1310, transmit a signal back to the first device indicating the adjustment performed by the second device, and the first device and the second device may communicate according to the updated configurations. Accordingly, the techniques described herein may facilitate the first device and the second device to more efficiently signal changes in configurations that may affect the link budget between them. By way of this signaling, the first device and the second device may perform an adjustment to, for example, more efficiently utilize an increased link budget or, alternatively, more reliably utilize a decreased link budget.

Figure 14:
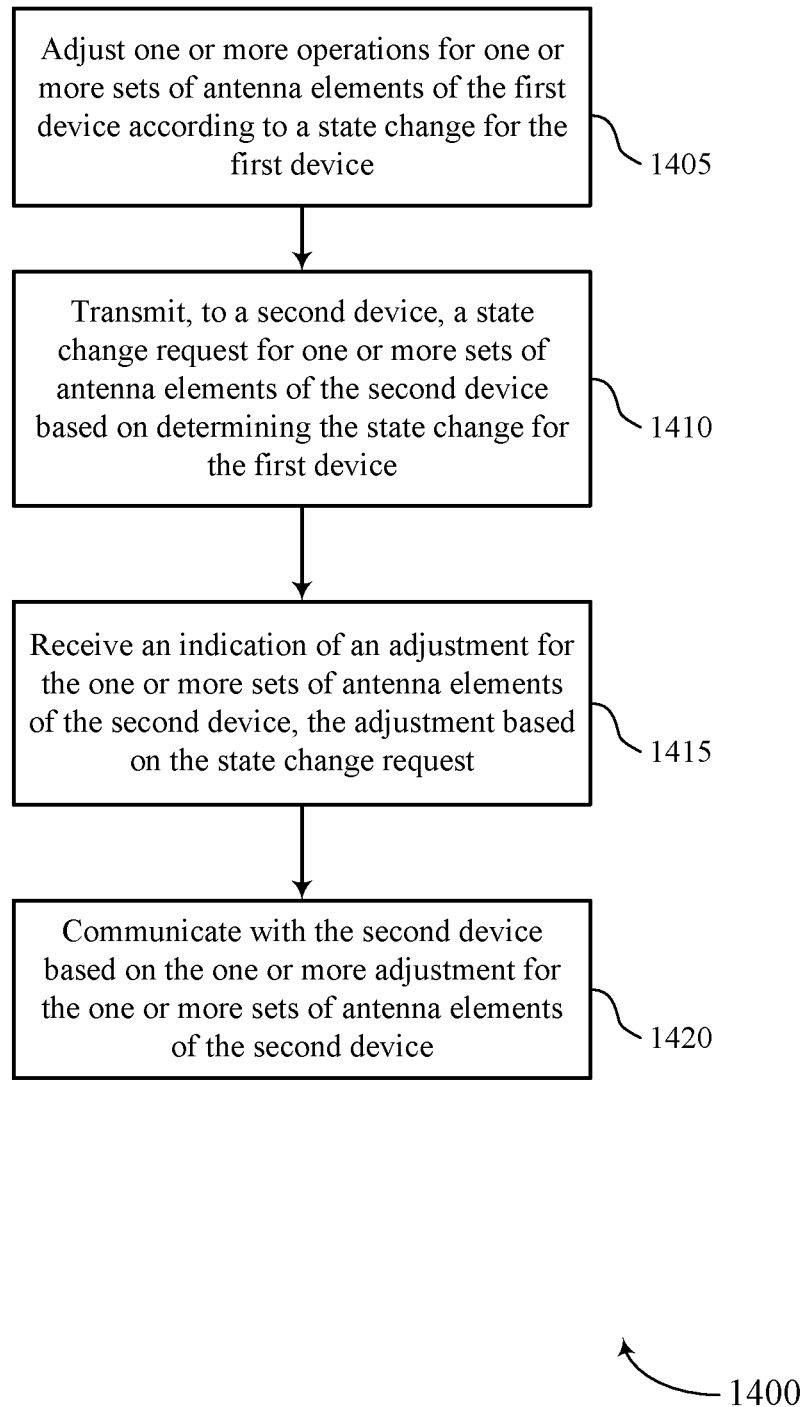
FIGS. 14 through 17 show flowcharts illustrating methods that support adjusting communications operations for changes to configurations for QCL and number of antenna elements in accordance with one or more aspects of the present disclosure.

FIG. 14 shows a flowchart illustrating a method 1400 that supports adjusting communications operations for changes to configurations for QCL and number of antenna elements in accordance with one or more aspects of the present disclosure. The operations of method 1400 may be implemented by a first device or its components as described herein. For example, the operations of method 1400 may be performed by a communications manager as described with reference to FIGS. 6 through 9. In some examples, a first device may execute a set of instructions to control the functional elements of the first device to perform the functions described below. Additionally or alternatively, a first device may perform aspects of the functions described below using special-purpose hardware.

At 1405, the first device may adjust one or more operations for one or more sets of antenna elements of the first device according to a state change for the first device. The operations of 1405 may be performed according to the methods described herein. In some examples, aspects of the operations of 1405 may be performed by an adjustment manager as described with reference to FIGS. 6 through 9.

At 1410, the first device may transmit, to the second device, a state change request for one or more sets of antenna elements of the second device based on determining the state change for the first device, where the state change is based on a condition associated with communications between the first device and the second device. The operations of 1410 may be performed according to the methods described herein. In some examples, aspects of the operations of 1410 may be performed by a state change request manager as described with reference to FIGS. 6 through 9.

At 1415, the first device may receive an indication of an adjustment for the one or more sets of antenna elements of the second device, the adjustment based on the state change request. The operations of 1415 may be performed according to the methods described herein. In some examples, aspects of the operations of 1415 may be performed by an adjustment indication manager as described with reference to FIGS. 6 through 9.

At 1420, the first device may communicate with the second device based on the adjustment for the one or more sets of antenna elements of the second device. The operations of 1420 may be performed according to the methods described herein. In some examples, aspects of the operations of 1420 may be performed by a transmission manager as described with reference to FIGS. 6 through 9.

Figure 15:
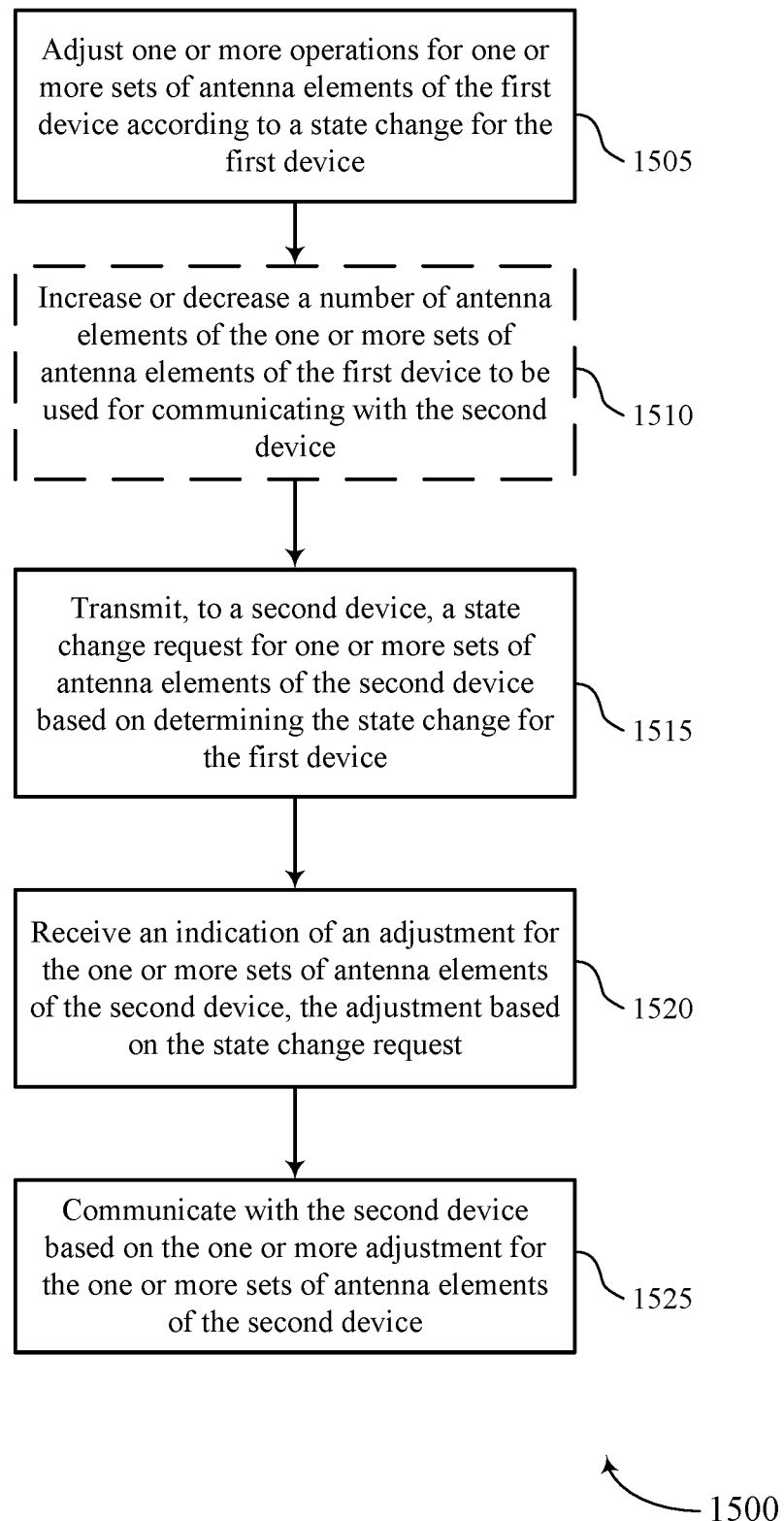

FIG. 15 shows a flowchart illustrating a method 1500 that supports adjusting communications operations for changes to configurations for QCL and number of antenna elements in accordance with one or more aspects of the present disclosure. The operations of method 1500 may be implemented by a first device or its components as described herein. For example, the operations of method 1500 may be performed by a communications manager as described with reference to FIGS. 6 through 9. In some examples, a first device may execute a set of instructions to control the functional elements of the first device to perform the functions described below. Additionally or alternatively, a first device may perform aspects of the functions described below using special-purpose hardware.

At 1505, the first device may adjust one or more operations for one or more sets of antenna elements of the first device according to a state change for the first device. The operations of 1505 may be performed according to the methods described herein. In some examples, aspects of the operations of 1505 may be performed by an adjustment manager as described with reference to FIGS. 6 through 9.

At 1510, in some examples, the adjusting may include increasing or decreasing a number of antenna elements of the one or more sets of antenna elements of the first device to be used for communicating with the second device. The operations of 1510 may be performed according to the methods described herein. In some examples, aspects of the operations of 1510 may be performed by an adjustment manager as described with reference to FIGS. 6 through 9.

At 1515, the first device may transmit, to the second device, a state change request for one or more sets of antenna elements of the second device based on determining the state change for the first device, where the state change is based on a condition associated with communications between the first device and the second device. The operations of 1515 may be performed according to the methods described herein. In some examples, aspects of the operations of 1515 may be performed by a state change request manager as described with reference to FIGS. 6 through 9.

At 1520, the first device may receive an indication of an adjustment for the one or more sets of antenna elements of the second device, the adjustment based on the state change request. The operations of 1520 may be performed according to the methods described herein. In some examples, aspects of the operations of 1520 may be performed by an adjustment indication manager as described with reference to FIGS. 6 through 9.

At 1525, the first device may communicate with the second device based on the adjustment for the one or more sets of antenna elements of the second device. The operations of 1525 may be performed according to the methods described herein. In some examples, aspects of the operations of 1525 may be performed by a transmission manager as described with reference to FIGS. 6 through 9.

Figure 16:
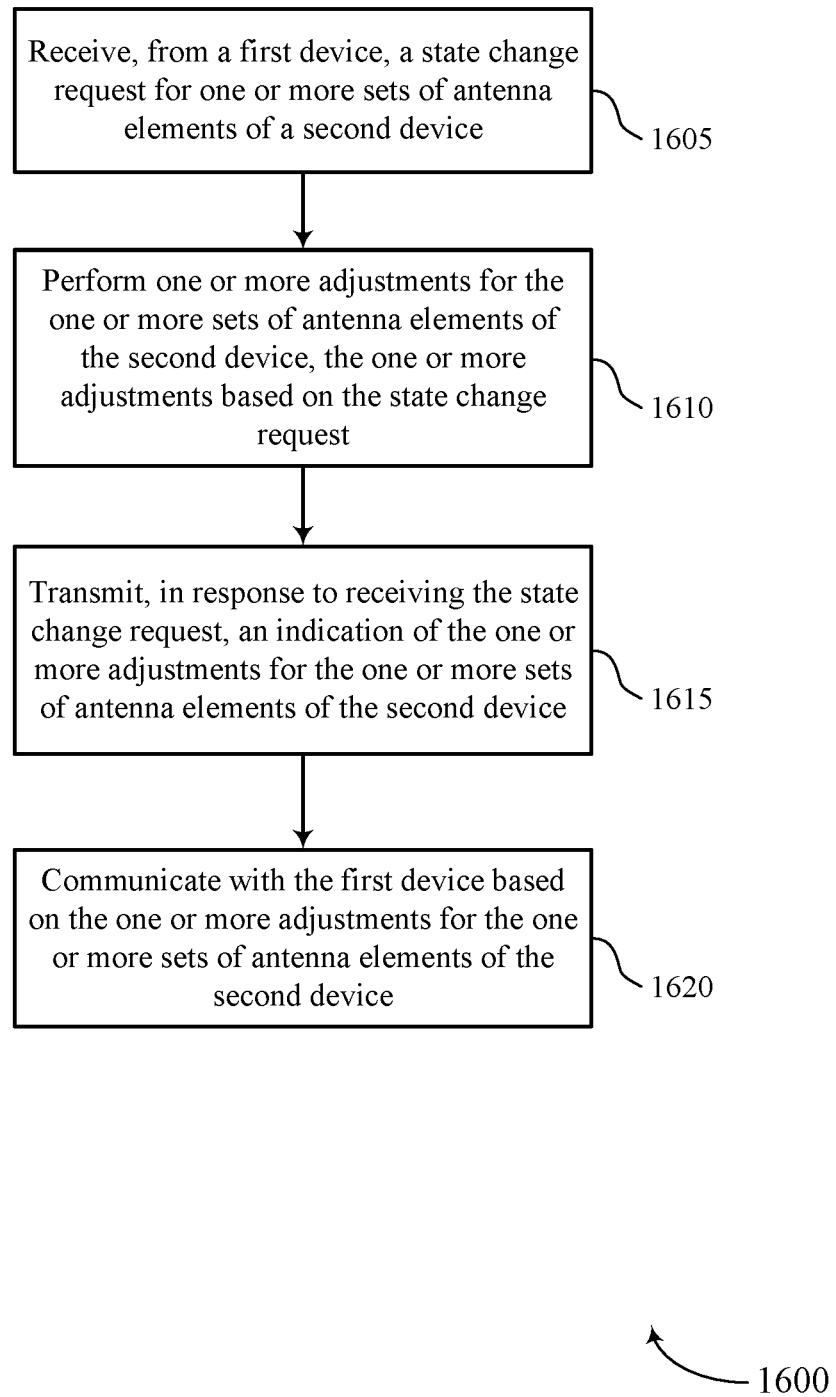

FIG. 16 shows a flowchart illustrating a method 1600 that supports adjusting communications operations for changes to configurations for QCL and number of antenna elements in accordance with one or more aspects of the present disclosure. The operations of method 1600 may be implemented by a second device or its components as described herein. For example, the operations of method 1600 may be performed by a communications manager as described with reference to FIGS. 10 through 13. In some examples, a second device may execute a set of instructions to control the functional elements of the second device to perform the functions described below. Additionally or alternatively, a second device may perform aspects of the functions described below using special-purpose hardware.

At 1605, the base station may receive, from a first device, a state change request for one or more sets of antenna elements of a second device. In some examples, the state change request may be based on one or more operations for one or more sets of antenna elements of the first device. In some examples, the one or more operations may be adjusted according to a state change for the first device. The operations of 1605 may be performed according to the methods described herein. In some examples, aspects of the operations of 1605 may be performed by a state change request manager as described with reference to FIGS. 10 through 13.

At 1610, the base station may perform an adjustment for the one or more sets of antenna elements of the second device, the adjustment based on the state change request. The operations of 1610 may be performed according to the methods described herein. In some examples, aspects of the operations of 1610 may be performed by an adjustment manager as described with reference to FIGS. 10 through 13.

At 1615, the base station may transmit, in response to receiving the state change request, an indication of the adjustment for the one or more sets of antenna elements of the second device. The operations of 1615 may be performed according to the methods described herein. In some examples, aspects of the operations of 1615 may be performed by an adjustment indication manager as described with reference to FIGS. 10 through 13.

At 1620, the base station may communicate with the first device based on the adjustment for the one or more sets of antenna elements of the second device. The operations of 1620 may be performed according to the methods described herein. In some examples, aspects of the operations of 1620 may be performed by a transmission manager as described with reference to FIGS. 10 through 13.

Figure 17:
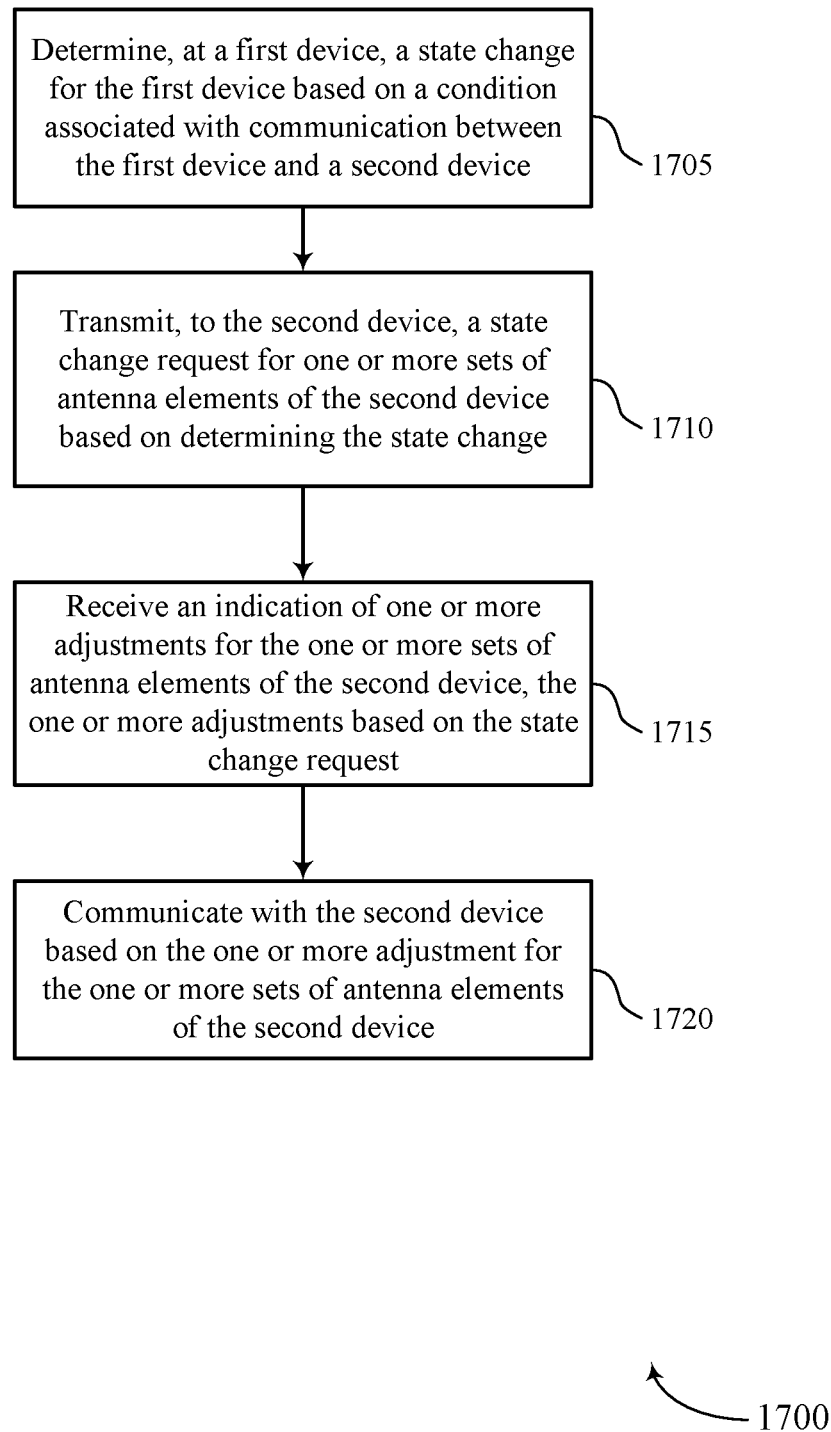

FIG. 17 shows a flowchart illustrating a method 1700 that supports adjusting communications operations for changes to configurations for QCL and number of antenna elements in accordance with one or more aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine, at a first device, a state change for the first device based on a condition associated with communications between the first device and a second device. The operations of 1705 may be performed according to the methods described herein. In some examples, aspects of the operations of 1705 may be performed by an adjustment manager as described with reference to FIGS. 6 through 9.

At 1710, the UE may transmit, to the second device, a state change request for one or more sets of antenna elements of the second device based on determining the state change. The operations of 1710 may be performed according to the methods described herein. In some examples, aspects of the operations of 1710 may be performed by a state change request manager as described with reference to FIGS. 6 through 9.

At 1715, the UE may receive an indication of an adjustment for the one or more sets of antenna elements of the second device, the adjustment based on the state change request. The operations of 1715 may be performed according to the methods described herein. In some examples, aspects of the operations of 1715 may be performed by an adjustment indication manager as described with reference to FIGS. 6 through 9.

At 1720, the UE may communicate with the second device based on the adjustment for the one or more sets of antenna elements of the second device. The operations of 1720 may be performed according to the methods described herein. In some examples, aspects of the operations of 1720 may be performed by a transmission manager as described with reference to FIGS. 6 through 9.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory coupled to the one or more processors storing instructions executable by the one or more processors to cause the system or apparatus to implement methods. It is to be understood that these are just some examples of possible examples, and other examples will be readily apparent to those skilled in the art without departing from the scope of the disclosure.

Summary of Aspects

The following provides an overview of aspects of the present disclosure:

Aspect 1: A method for wireless communications at a first device, comprising: adjusting one or more operations for one or more sets of antenna elements of the first device according to a state change for the first device; transmitting, to a second device, a state change request for one or more sets of antenna elements of the second device based at least in part on determining the state change for the first device, wherein the state change is based at least in part on a condition associated with communications between the first device and the second device; receiving an indication of an adjustment for the one or more sets of antenna elements of the second device, the adjustment based at least in part on the state change request; and communicating with the second device based at least in part on the adjustment for the one or more sets of antenna elements of the second device.

Aspect 2: The method of aspect 1, wherein adjusting the one or more operations for the one or more sets of antenna elements of the first device comprises: increasing or decreasing a number of antenna elements of the one or more sets of antenna elements of the first device to be used for communicating with the second device.

Aspect 3: The method of aspect 1, wherein adjusting the one or more operations for the one or more sets of antenna elements of the first device comprises: changing a QCL configuration associated with the one or more sets of antenna elements of the first device for communicating with the second device.

Aspect 4: The method of any of aspects 1 through 3, wherein the indication of the adjustment for the one or more sets of antenna elements of the second device indicates an updated transmit power of the second device that is associated with transmissions to the first device.

Aspect 5: The method of any of aspects 1 through 4, wherein the indication of the adjustment for the one or more sets of antenna elements of the second device indicates an updated MCS for the communications between the first device and the second device.

Aspect 6: The method of any of aspects 1 through 5, wherein the indication of the adjustment for the one or more sets of antenna elements of the second device is received via a PDCCH or a PUCCH.

Aspect 7: The method of any of aspects 1 through 6, wherein the indication of the adjustment for the one or more sets of antenna elements of the second device is received via one or more of DCI, a MAC-CE, or RRC signaling.

Aspect 8: The method of any of aspects 1 through 7, further comprising: identifying a metric associated with the communications between the first device and the second device, wherein the condition is based at least in part on a change of the metric.

Aspect 9: The method of aspect 8, wherein the condition comprises the change of the metric exceeding a threshold.

Aspect 10: The method of any of aspects 8 and 9, wherein the metric comprises a signal quality associated with the communications between the first device and the second device.

Aspect 11: The method of any of aspects 1 through 10, wherein the condition is based at least in part on a thermal characteristic, a power characteristic, or both, of one or more of the first device or the second device.

Aspect 12: The method of any of aspects 1 through 11, wherein the first device is a UE in a wireless communications system and the second device is a base station in the wireless communications system.

Aspect 13: The method of any of aspects 1 through 12, wherein one or more of the first device or the second device is one of a base station, a CPE, a relay device, a router, a repeater, or an IAB node.

Aspect 14: A method for wireless communications, comprising: receiving, from a first device, a state change request for one or more sets of antenna elements of a second device, wherein the state change request is based at least in part on one or more operations for one or more sets of antenna elements of the first device; performing an adjustment for the one or more sets of antenna elements of the second device, the adjustment based at least in part on the state change request; transmitting, in response to receiving the state change request, an indication of the adjustment for the one or more sets of antenna elements of the second device; and communicating with the first device based at least in part on the adjustment for the one or more sets of antenna elements of the second device.

Aspect 15: The method of aspect 14, wherein the one or more operations for the one or more sets of antenna elements of the first device comprise an increased or decreased number of antenna elements of the one or more sets of antenna elements of the first device to be used for communicating with the second device.

Aspect 16: The method of aspect 14, wherein the one or more operations for the one or more sets of antenna elements of the first device comprise a changed QCL configuration associated with the one or more sets of antenna elements of the first device for communicating with the second device.

Aspect 17: The method of any of aspects 14 through 16, wherein performing the adjustment for the one or more sets of antenna elements of the second device comprises: updating a transmit power of the second device based at least in part on the state change request, the transmit power associated with transmissions to the first device, wherein the indication of the adjustment for the one or more sets of antenna elements of the second device indicates the updated transmit power.

Aspect 18: The method of any of aspects 14 through 17, wherein performing the adjustment for the one or more sets of antenna elements of the second device comprises: updating a MCS for communication between the first device and the second device based at least in part on the state change request, wherein the indication of the adjustment for the one or more sets of antenna elements of the second device indicates the updated MCS.

Aspect 19: The method of any of aspects 14 through 18, wherein the indication of the adjustment for the one or more sets of antenna elements of the second device is transmitted via a PDCCH or a PUCCH.

Aspect 20: The method of any of aspects 14 through 19, wherein the indication of the adjustment for the one or more sets of antenna elements of the second device is transmitted via one or more of DCI, a MAC-CE, or RRC signaling.

Aspect 21: The method of any of aspects 14 through 20, wherein the state change request is based at least in part on a condition associated with a metric associated with communication between the first device and the second device.

Aspect 22: The method of aspect 21, wherein the condition comprises a change of the metric exceeding a threshold.

Aspect 23: The method of any of aspects 21 through 22, wherein the metric comprises a signal quality associated with the communication between the first device and the second device.

Aspect 24: The method of any of aspects 21 through 23, wherein the condition is based at least in part on a thermal characteristic, a power characteristic, or both, of one or more of the first device or the second device.

Aspect 25: The method of any of aspects 14 through 24, wherein the first device is a UE in a wireless communications system and the second device is a base station in the wireless communications system.

Aspect 26: The method of any of aspects 14 through 25, wherein one or more of the first device or the second device is one of a base station, a CPE, a relay device, a router, a repeater, or an IAB node.

Aspect 27: An apparatus for wireless communications, comprising: a processor; and memory coupled to the processor, the processor and memory configured to perform a method of any of aspects 1 through 13.

Aspect 28: An apparatus for wireless communications at a first device, comprising at least one means for performing a method of any of aspects 1 through 13.

Aspect 29: A non-transitory computer-readable medium storing code for wireless communications at a first device, the code comprising instructions executable by a processor to perform a method of any of aspects 1 through 13.

Aspect 30: An apparatus for wireless communications, comprising: a processor; and memory coupled to the processor, the processor and memory configured to perform a method of any of aspects 14 through 26.

Aspect 31: An apparatus for wireless communications, comprising at least one means for performing a method of any of aspects 14 through 26.

Aspect 32: A non-transitory computer-readable medium storing code for wireless communications, the code comprising instructions executable by a processor to perform a method of any of aspects 14 through 26.

Aspect 33: A method for wireless communications, comprising: determining, at a first device, a state change for the first device based at least in part on a condition associated with communication between the first device and a second device; transmitting, to the second device, a state change request for one or more sets of antenna elements of the second device based at least in part on determining the state change; receiving an indication of an adjustment for the one or more sets of antenna elements of the second device, the adjustment based at least in part on the state change request; and communicating with the second device based at least in part on the adjustment for the one or more sets of antenna elements of the second device.

Aspect 34: The method of aspect 1, further comprising: adjusting one or more operations for one or more sets of antenna elements of the first device according to the state change for the first device.

Aspect 35: The method of aspect 2, wherein adjusting the one or more operations for the one or more sets of antenna elements of the first device comprises: increasing or decreasing a number of antenna elements of the one or more sets of antenna elements of the first device to be used for communicating with the second device.

Aspect 36: The method of aspect 2, wherein adjusting the one or more operations for the one or more sets of antenna elements of the first device comprises: changing a QCL configuration associated with the one or more sets of antenna elements of the first device for communicating with the second device.

Aspect 37: The method of any of aspects 1 through 4, wherein the indication of the adjustment for the one or more sets of antenna elements of the second device indicates an updated transmit power at the second device for transmitting to the first device.

Aspect 38: The method of any of aspects 1 through 5, wherein the indication of the adjustment for the one or more sets of antenna elements of the second device indicates an updated MCS for the communication between the first device and the second device.

Aspect 39: The method of any of aspects 1 through 6, wherein the indication of the adjustment for the one or more sets of antenna elements of the second device is received via a PDCCH or a PUCCH.

Aspect 40: The method of any of aspects 1 through 7, wherein the indication of the adjustment for the one or more sets of antenna elements of the second device is received via one or more of DCI, a MAC-CE, or RRC signaling.

Aspect 41: The method of any of aspects 1 through 8, further comprising: identifying a metric associated with the communication between the first device and the second device, wherein the condition is based at least in part on a change of the metric.

Aspect 42: The method of aspect 9, wherein the condition comprises the change of the metric exceeding a threshold.

Aspect 43: The method of any of aspects 9 through 10, wherein the metric comprises a signal quality associated with the communication between the first device and the second device.

Aspect 44: The method of any of aspects 1 through 11, wherein the condition is based at least in part on a thermal characteristic, a power characteristic, or both, of one or more of the first device or the second device.

Aspect 45: The method of any of aspects 1 through 12, wherein the first device is a UE in a wireless communications system and the second device is a base station in the wireless communications system.

Aspect 46: The method of any of aspects 1 through 13, wherein one or more of the first device or the second device is one of a base station, a CPE, a relay device, a router, a repeater, or an IAB node.

Aspect 47: A method for wireless communications, comprising: receiving, from a first device, a state change request for one or more sets of antenna elements of a second device; performing an adjustment for the one or more sets of antenna elements of the second device, the adjustment based at least in part on the state change request; transmitting, in response to receiving the state change request, an indication of the adjustment for the one or more sets of antenna elements of the second device; and communicating with the first device based at least in part on the adjustment for the one or more sets of antenna elements of the second device.

Aspect 48: The method of aspect 15, wherein the state change request is based at least in part on one or more adjusted operations for one or more sets of antenna elements of the first device according to a state change for the first device.

Aspect 49: The method of aspect 16, wherein the one or more adjusted operations for the one or more sets of antenna elements of the first device comprise an increased or decreased number of antenna elements of the one or more sets of antenna elements of the first device to be used for communicating with the second device.

Aspect 50: The method of aspect 16, wherein the one or more adjusted operations for the one or more sets of antenna elements of the first device comprise a changed QCL configuration associated with the one or more sets of antenna elements of the first device for communicating with the second device.

Aspect 51: The method of any of aspects 15 through 18, wherein performing the adjustment for the one or more sets of antenna elements of the second device comprises: updating a transmit power at the second device for transmitting to the first device based at least in part on the state change request, wherein the indication of the adjustment for the one or more sets of antenna elements of the second device indicates the updated transmit power.

Aspect 52: The method of any of aspects 15 through 19, wherein performing the adjustment for the one or more sets of antenna elements of the second device comprises: updating a MCS for communication between the first device and the second device based at least in part on the state change request, wherein the indication of the adjustment for the one or more sets of antenna elements of the second device indicates the updated MCS.

Aspect 53: The method of any of aspects 15 through 20, wherein the indication of the adjustment for the one or more sets of antenna elements of the second device is transmitted via a PDCCH or a PUCCH.

Aspect 54: The method of any of aspects 15 through 21, wherein the indication of the adjustment for the one or more sets of antenna elements of the second device is transmitted via one or more of DCI, a MAC-CE, or RRC signaling.

Aspect 55: The method of any of aspects 15 through 22, wherein the state change request is based at least in part on a condition associated with a metric associated with communication between the first device and the second device.

Aspect 56: The method of aspect 23, wherein the condition comprises a change of the metric exceeding a threshold.

Aspect 57: The method of any of aspects 15 through 24, wherein the metric comprises a signal quality associated with the communication between the first device and the second device.

Aspect 58: The method of any of aspects 15 through 25, wherein the condition is based at least in part on a thermal characteristic, a power characteristic, or both, of one or more of the first device or the second device.

Aspect 59: The method of any of aspects 15 through 26, wherein the first device is a UE in a wireless communications system and the second device is a base station in the wireless communications system.

Aspect 60: The method of any of aspects 15 through 59, wherein one or more of the first device or the second device is one of a base station, a CPE, a relay device, a router, a repeater, or an IAB node.

Aspect 61: An apparatus for wireless communications, comprising a processor; memory coupled with the processor; and instructions stored in the memory and executable by the processor to cause the apparatus to perform a method of any of aspects 1 through 14.

Aspect 62: An apparatus for wireless communications, comprising at least one means for performing a method of any of aspects 1 through 14.

Aspect 63: A non-transitory computer-readable medium storing code for wireless communications, the code comprising instructions executable by a processor to perform a method of any of aspects 1 through 14.

Aspect 64: An apparatus for wireless communications, comprising a processor; memory coupled with the processor; and instructions stored in the memory and executable by the processor to cause the apparatus to perform a method of any of aspects 15 through 60.

Aspect 65: An apparatus for wireless communications, comprising at least one means for performing a method of any of aspects 15 through 60.

Aspect 66: A non-transitory computer-readable medium storing code for wireless communications, the code comprising instructions executable by a processor to perform a method of any of aspects 15 through 60.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
adjusting one or more operations for one or more first sets of antenna elements of the first device according to a state change for the first device;
transmitting, to a second device after initiating a first adjustment of the one or more operations for the one or more first sets of antenna elements of the first device, a state change request for one or more second sets of antenna elements of the second device based at least in part on the state change for the first device, wherein the state change is based at least in part on a condition associated with communications between the first device and the second device, and wherein the state change request indicates that the first device initiated the first adjustment of the one or more operations for the one or more first sets of antenna elements of the first device;
receiving, in response to the state change request, a response message that indicates a second adjustment for the one or more second sets of antenna elements of the second device, the second adjustment based at least in part on the state change request; and
communicating with the second device based at least in part on the response message and the second adjustment for the one or more second sets of antenna elements of the second device.

2. The method of claim 1, wherein adjusting the one or more operations for the one or more first sets of antenna elements of the first device comprises:
increasing or decreasing a number of first antenna elements of the one or more first sets of antenna elements of the first device to be used for communicating with the second device.

3. The method of claim 1, wherein adjusting the one or more operations for the one or more first sets of antenna elements of the first device comprises:
changing a quasi co-location (QCL) configuration associated with the one or more first sets of antenna elements of the first device for communicating with the second device.

4. The method of claim 1, wherein the response message that indicates the second adjustment for the one or more second sets of antenna elements of the second device indicates an updated transmit power of the second device that is associated with transmissions to the first device.

5. The method of claim 1, wherein the response message that indicates the second adjustment for the one or more second sets of antenna elements of the second device indicates an updated modulation and coding scheme (MCS) for the communications between the first device and the second device.

6. The method of claim 1, wherein the response message that indicates the second adjustment for the one or more second sets of antenna elements of the second device is received via a physical downlink control channel (PDCCH) or a physical uplink control channel (PUCCH).

7. The method of claim 1, wherein the response message that indicates the second adjustment for the one or more second sets of antenna elements of the second device is received via one or more of downlink control information (DCI), a medium access control (MAC) control element (MAC-CE), or radio resource control (RRC) signaling.

8. The method of claim 1, further comprising:
identifying a metric associated with the communications between the first device and the second device, wherein the condition is based at least in part on a change of the metric.

9. The method of claim 8, wherein the condition comprises the change of the metric exceeding a threshold.

10. The method of claim 8, wherein the metric comprises a signal quality associated with the communications between the first device and the second device.

11. The method of claim 1, wherein the condition is based at least in part on a thermal characteristic, a power characteristic, or both, of one or more of the first device or the second device.

12. The method of claim 1, wherein the first device is a user equipment (UE) in a wireless communications system and the second device is a network entity in the wireless communications system.

13. The method of claim 1, wherein one or more of the first device or the second device is one of a network entity, a customer premises equipment (CPE), a relay device, a router, a repeater, or an integrated access and backhaul (IAB) node.

14. A method for wireless communications, comprising:
receiving a state change request for one or more second sets of antenna elements of a second device, wherein the state change request indicates that a first device initiated a first adjustment of one or more operations for one or more first sets of antenna elements of the first device;
performing a second adjustment for the one or more second sets of antenna elements of the second device, the second adjustment based at least in part on the state change request;
transmitting, in response to the state change request and based at least in part on the second adjustment for the one or more second sets of antenna elements, a response message that indicates the second adjustment for the one or more second sets of antenna elements of the second device; and
communicating based at least in part on the response message and the second adjustment for the one or more second sets of antenna elements of the second device.

15. The method of claim 14, wherein the one or more operations for the one or more first sets of antenna elements of the first device comprise an increased or decreased number of first antenna elements of the one or more first sets of antenna elements of the first device to be used for communicating with the second device.

16. The method of claim 14, wherein the one or more operations for the one or more first sets of antenna elements of the first device comprise a changed quasi co-location (QCL) configuration associated with the one or more first sets of antenna elements of the first device for communicating with the second device.

17. The method of claim 14, wherein performing the second adjustment for the one or more second sets of antenna elements of the second device comprises:
    updating a transmit power of the second device based at least in part on the state change request, the transmit power associated with transmissions to the first device, wherein the response message that indicates the second adjustment for the one or more second sets of antenna elements of the second device indicates the updated transmit power.

18. The method of claim 14, wherein performing the second adjustment for the one or more second sets of antenna elements of the second device comprises:
    updating a modulation and coding scheme (MCS) for communication between the first device and the second device based at least in part on the state change request, wherein the response message that indicates the second adjustment for the one or more second sets of antenna elements of the second device indicates the updated MCS.

19. The method of claim 14, wherein the response message that indicates the second adjustment for the one or more second sets of antenna elements of the second device is transmitted via a physical downlink control channel (PDCCH) or a physical uplink control channel (PUCCH).

20. The method of claim 14, wherein the response message that indicates the second adjustment for the one or more second sets of antenna elements of the second device is transmitted via one or more of downlink control information (DCI), a medium access control (MAC) control element (MAC-CE), or radio resource control (RRC) signaling.

21. The method of claim 14, wherein the state change request is based at least in part on a condition associated with a metric associated with communication between the first device and the second device.

22. The method of claim 21, wherein the condition comprises a change of the metric exceeding a threshold.

23. The method of claim 21, wherein the metric comprises a signal quality associated with the communication between the first device and the second device.

24. The method of claim 21, wherein the condition is based at least in part on a thermal characteristic, a power characteristic, or both, of one or more of the first device or the second device.

25. The method of claim 14, wherein the first device is a user equipment (UE) in a wireless communications system and the second device is a network entity in the wireless communications system.

26. The method of claim 14, wherein one or more of the first device or the second device is one of a network entity, a customer premises equipment (CPE), a relay device, a router, a repeater, or an integrated access and backhaul (IAB) node.

27. An apparatus for wireless communications at a first device, comprising:
    means for adjusting one or more operations for one or more first sets of antenna elements of the first device according to a state change for the first device;
    means for transmitting, to a second device after initiating a first adjustment of the one or more operations for the one or more first sets of antenna elements of the first device, a state change request for one or more second sets of antenna elements of the second device based at least in part on the state change for the first device, wherein the state change is based at least in part on a condition associated with communications between the first device and the second device, and wherein the state change request indicates that the first device initiated the first adjustment of the one or more operations for the one or more first sets of antenna elements of the first device;
    means for receiving, in response to the state change request, a response message that indicates a second adjustment for the one or more second sets of antenna elements of the second device, the second adjustment based at least in part on the state change request; and
    means for communicating with the second device based at least in part on the response message and the second adjustment for the one or more second sets of antenna elements of the second device.

28. The apparatus of claim 27, wherein the means for adjusting the one or more operations for the one or more first sets of antenna elements of the first device comprise:
    means for increasing or decreasing a number of antenna elements of the one or more first sets of antenna elements of the first device to be used for communicating with the second device.

29. The apparatus of claim 27, wherein the means for adjusting the one or more operations for the one or more first sets of antenna elements of the first device comprise:
    means for changing a quasi co-location (QCL) configuration associated with the one or more first sets of antenna elements of the first device for communicating with the second device.

30. An apparatus for wireless communications, comprising:
    means for receiving a state change request for one or more second sets of antenna elements of a second device, wherein the state change request indicates that a first device initiated a first adjustment of one or more operations for one or more first sets of antenna elements of the first device;
    means for performing a second adjustment for the one or more second sets of antenna elements of the second device, the second adjustment based at least in part on the state change request;
    means for transmitting, in response to the state change request and based at least in part on the second adjustment for the one or more second sets of antenna elements, a response message that indicates the second adjustment for the one or more second sets of antenna elements of the second device; and
    means for communicating based at least in part on the response message and the second adjustment for the one or more second sets of antenna elements of the second device.

31. An apparatus for wireless communication at a first device, comprising:
    one or more memories; and
    one or more processors coupled with the one or more memories and configured to cause the first device to:
        adjust one or more operations for one or more first sets of antenna elements of the first device according to a state change for the first device;
        transmit, to a second device after initiating a first adjustment of the one or more operations for the one or more first sets of antenna elements of the first device, a state change request for one or more second sets of antenna elements of the second device based at least in part on the state change for the first device, wherein the state change is based at least in part on a condition associated with communications between the first device and the second device, and wherein the state change request indicates that the first device initiated the first adjustment of the one or more operations for the one or more first sets of antenna elements of the first device;

receive, in response to the state change request, a response message that indicates a second adjustment for the one or more second sets of antenna elements of the second device, the second adjustment based at least in part on the state change request; and communicate with the second device based at least in part on the response message and the second adjustment for the one or more second sets of antenna elements of the second device.

32. The apparatus of claim 31, wherein, to adjust the one or more operations for the one or more first sets of antenna elements of the first device, the one or more processors are configured to cause the first device to:

increase or decrease a number of first antenna elements of the one or more first sets of antenna elements of the first device to be used to communicate with the second device.

33. The apparatus of claim 31, wherein, to adjust the one or more operations for the one or more first sets of antenna elements of the first device, the one or more processors are configured to cause the first device to:

change a quasi co-location (QCL) configuration associated with the one or more first sets of antenna elements of the first device for communications with the second device.

34. An apparatus for wireless communication, comprising:

one or more memories; and
one or more processors coupled with the one or more memories and configured to:
receive a state change request for one or more second sets of antenna elements of a second device, wherein the state change request indicates that a first device initiated a first adjustment of one or more operations for one or more first sets of antenna elements of the first device;

perform a second adjustment for the one or more second sets of antenna elements of the second device, the second adjustment based at least in part on the state change request;

transmit, in response to the state change request and based at least in part on the second adjustment for the one or more second sets of antenna elements, a response message that indicates the second adjustment for the one or more second sets of antenna elements of the second device; and communicate based at least in part on the response message and the second adjustment for the one or more second sets of antenna elements of the second device.

35. The apparatus of claim 34, wherein the one or more operations for the one or more first sets of antenna elements of the first device comprise an increased or decreased number of first antenna elements of the one or more first sets of antenna elements of the first device to be used for communications with the second device.

36. The apparatus of claim 34, wherein the one or more operations for the one or more first sets of antenna elements of the first device comprise a changed quasi co-location (QCL) configuration associated with the one or more first sets of antenna elements of the first device for communications with the second device.

37. A non-transitory computer-readable medium storing code for wireless communication at a first device, the code comprising instructions executable by one or more processors to cause the first device to:

adjust one or more operations for one or more first sets of antenna elements of the first device according to a state change for the first device;

transmit, to a second device after initiating a first adjustment of the one or more operations for the one or more first sets of antenna elements of the first device, a state change request for one or more second sets of antenna elements of the second device based at least in part on the state change for the first device, wherein the state change is based at least in part on a condition associated with communications between the first device and the second device, and wherein the state change request indicates that the first device initiated the first adjustment of the one or more operations for the one or more first sets of antenna elements of the first device;

receive, in response to the state change request, a response message that indicates a second adjustment for the one or more second sets of antenna elements of the second device, the second adjustment based at least in part on the state change request; and communicate with the second device based at least in part on the response message and the second adjustment for the one or more second sets of antenna elements of the second device.

38. The non-transitory computer-readable medium of claim 37, wherein the instructions to adjust the one or more operations for the one or more first sets of antenna elements of the first device are executable by the one or more processors to:

increase or decrease a number of first antenna elements of the one or more first sets of antenna elements of the first device to be used to communicate with the second device.

39. The non-transitory computer-readable medium of claim 37, wherein the instructions to adjust the one or more operations for the one or more first sets of antenna elements of the first device are executable by the one or more processors to:

change a quasi co-location (QCL) configuration associated with the one or more first sets of antenna elements of the first device for communications with the second device.

40. A non-transitory computer-readable medium storing code for wireless communication, the code comprising instructions executable by one or more processors to:

receive a state change request for one or more second sets of antenna elements of a second device, wherein the state change request indicates that a first device initiated a first adjustment of one or more operations for one or more first sets of antenna elements of the first device;

perform a second adjustment for the one or more second sets of antenna elements of the second device, the second adjustment based at least in part on the state change request;

transmit, in response to the state change request and based at least in part on the second adjustment for the one or more second sets of antenna elements, a response message that indicates the second adjustment for the one or more second sets of antenna elements of the second device; and communicate based at least in part on the response message and the second adjustment for the one or more second sets of antenna elements of the second device.

41. The non-transitory computer-readable medium of claim 40, wherein the one or more operations for the one or more first sets of antenna elements of the first device comprise an increased or decreased number of first antenna elements of the one or more first sets of antenna elements of the first device to be used for communicating with the second device.

42. The non-transitory computer-readable medium of claim 40, wherein the one or more operations for the one or more first sets of antenna elements of the first device comprise a changed quasi co-location (QCL) configuration associated with the one or more first sets of antenna elements of the first device for communicating with the second device.

* * * * *